US012629958B2

(12) United States Patent
Jones

(10) Patent No.: US 12,629,958 B2
(45) Date of Patent: May 19, 2026

(54) STRAIGHT-EDGE DRAWING GUIDE

(71) Applicant: Dexter A Jones, Suisun City, CA (US)

(72) Inventor: Dexter A Jones, Suisun City, CA (US)

( * ) Notice: Subject to any disclaimer, the term of this patent is extended or adjusted under 35 U.S.C. 154(b) by 360 days.

(21) Appl. No.: 18/346,094

(22) Filed: Jun. 30, 2023

(65) Prior Publication Data

US 2024/0042792 A1 Feb. 8, 2024

Related U.S. Application Data

(63) Continuation-in-part of application No. 18/148,615, filed on Dec. 30, 2022, now abandoned.

(60) Provisional application No. 63/295,376, filed on Dec. 30, 2021.

(51) Int. Cl.
*B43L 7/04* (2006.01)

(52) U.S. Cl.
CPC ...................................... *B43L 7/04* (2013.01)

(58) Field of Classification Search
CPC .. B43L 7/04; B43L 7/005; B43L 7/007; B43L 13/001; B44D 3/225
See application file for complete search history.

(56) References Cited

U.S. PATENT DOCUMENTS

| | | | | | |
|---|---|---|---|---|---|
| 2,646,626 | A * | 7/1953 | Palin | B42F 5/02 | 33/427 |
| 4,989,332 | A * | 2/1991 | Worrallo | B43L 7/005 | 33/376 |
| 5,842,402 | A * | 12/1998 | Collier | B26B 29/06 | 83/745 |
| 6,324,766 | B1 * | 12/2001 | Schooley | B26B 29/06 | 83/455 |
| 6,349,479 | B1 * | 2/2002 | Bottega | B26B 29/02 | 33/492 |
| 6,782,629 | B2 * | 8/2004 | Jimenez | B43L 7/005 | 33/483 |
| 2002/0095804 | A1 * | 7/2002 | Coplan | F16P 1/00 | 33/492 |
| 2002/0166250 | A1 * | 11/2002 | Jimenez | B43L 7/005 | 33/483 |
| 2024/0042792 | A1 * | 2/2024 | Jones | B43L 13/001 | |

* cited by examiner

*Primary Examiner* — Yaritza Guadalupe-Mccall
(74) *Attorney, Agent, or Firm* — West & Associates, A PC; Stuart J. West; Charlotte Rodeen-Dickert

(57) ABSTRACT

A straight-edge drawing guide comprising a base having an elongated 90-degree member attached to one edge and capable of being moved along a planar surface. An angular measuring device allows a user to adjust the position of the guide to any angle relative to a desired datum. A user can then use a marking device adjacent to the guide to produce substantially straight lines.

1 Claim, 28 Drawing Sheets

STRAIGHT-EDGE DRAWING GUIDE

CROSS-REFERENCE TO RELATED PATENT APPLICATIONS

This application is a Continuation-in-Part of co-pending U.S. Utility patent application Ser. No. 18/148,615, filed on Dec. 30, 2022 by Dexter A. Jones, which claims the benefit of priority under 35 U.S.C. § 119 to prior filed provisional patent application No. 63/295,376, filed on Dec. 30, 2021 by Dexter A. Jones, the entirety of each of which is hereby expressly incorporated herein by reference.

BACKGROUND

Technical Field

The present device relates to the field of drawing and drafting devices, particularly devices for drawing straight lines.

Background

In graphic art and drafting, drawing straight lines with a brush, brush pen, or marker by hand can be difficult. Although a straight-edge can be used, the ink (or paint, ink/paint) can seep under the edge, leaving unsightly globs and smears. Current devices seek to eliminate this by raising the edge of a guide slightly over a drawing surface. However, these devices do not completely eliminate the problem and can have limited use.

What is needed is a device allowing multiple methods to make clean lines.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1A:
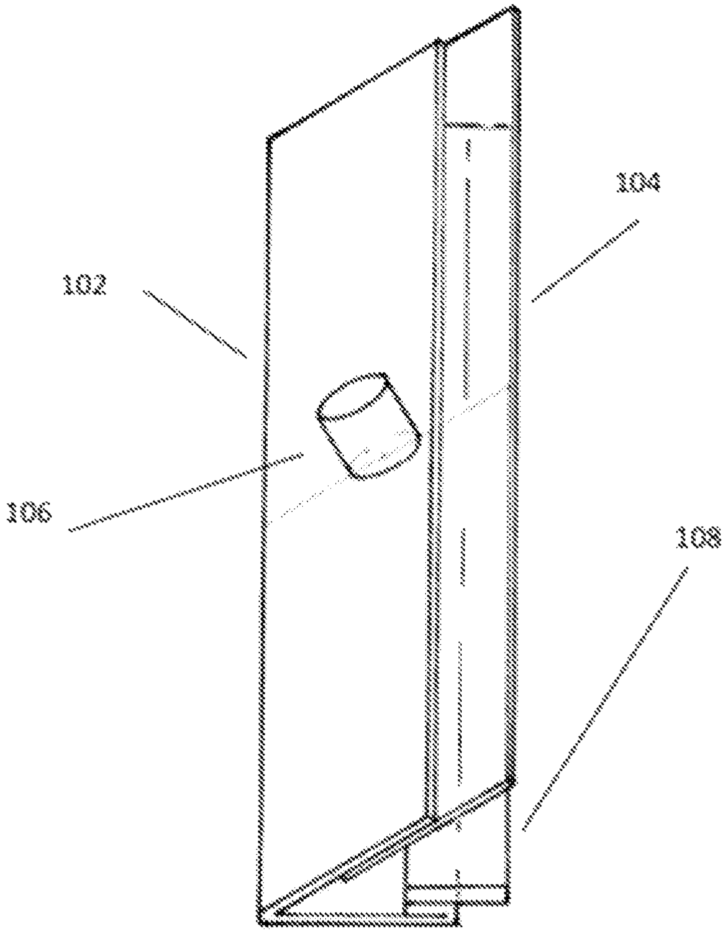
FIG. 1*a* depicts a top perspective view of an embodiment of the present device.

FIG. 1*a* depicts a top perspective view of an embodiment of the present device. In some embodiments, a first elongated member 102 can be folded longitudinally at an angle of approximately 30 degrees substantially proximal to the central longitudinal axis of a first elongated member 102. In other embodiments, a first elongated member 102 can be folded longitudinally at any other known and/or convenient location and at any other known and/or convenient angle to form an upper portion and a lower portion. A first elongated member 102 can also be folded over inward along a first longitudinal edge at a lower portion. In some embodiments, this fold can be less than approximately one-eighth of the total width of a first elongated member 102, but in other embodiments can be any other known and/or convenient dimension. In some embodiments, a first elongate member 102 can be fabricated of metal, such as, but not limited to aluminum, but in other embodiments can be a polymer, glass, wood, or any other known and/or convenient material.

As shown in FIG. 1*a*, a second elongated member 104 can be removably connected along an opposite second longitudinal edge of an upper portion of a first elongated member 102. In some embodiments, a second elongated member 104 can be positioned proximal to inside surface of a first elongated member 102 such that a second elongated member 104 can extend laterally from the opposite second longitudinal edge of a first elongated member 102. In some embodiments, approximately one-half of the width of a second elongated member 104 can overlap with the second longitudinal edge of the upper portion of a first elongated member 102, but in other embodiments can overlap by any other known and/or convenient dimension. A second elongated member 104 can be removably connected to a first elongated member 102 via screws, glue, or any other known and/or convenient fastener. In some embodiments, a second elongated member 104 can be made of a substantially transparent polymer, but in other embodiments can be made of glass, wood, any other known and/or convenient material.

In some embodiments, an adjustment handle 106 can be a substantially cylindrical knob extending substantially perpendicularly through the thickness of an upper portion of a first elongated member 102 and a second elongated member 104. In some embodiments, an adjustment handle 106 can also removably connect a first elongated member 102 and a second elongated member 104. Although depicted in FIG. 1*a* as substantially cylindrical, an adjustment handle 106 can have any other known and/or convenient geometry and/or dimensions. In some embodiments, an adjustment handle 106 can be made of metal, polymer, wood, glass, or any other known and/or convenient material.

A third elongated member 108 can be removably connected along the first longitudinal folded edge of the lower portion of a first elongated member 102. In some embodiments, a third elongated member 108 can be positioned proximal to the folded surface of a first elongated member 102 such that a third elongated member 108 can extend laterally from the first longitudinal folded edge of a first elongated member 102. In some embodiments, approximately one-half of the width of a third elongated member 108 can overlap with the first longitudinal edge of the lower portion of a first elongated member 102, but in other embodiments can overlap by any other known and/or convenient dimension. A third elongated member 108 can be removably connected to a first elongated member 102 via fasteners, which can be screws, snaps, glue, or any other known and/or convenient device. In some embodiments, a third elongated member 106 can be made of a substantially transparent polymer, but in other embodiments can be made of glass, wood, or any other known and/or convenient material.

Figure 1B:
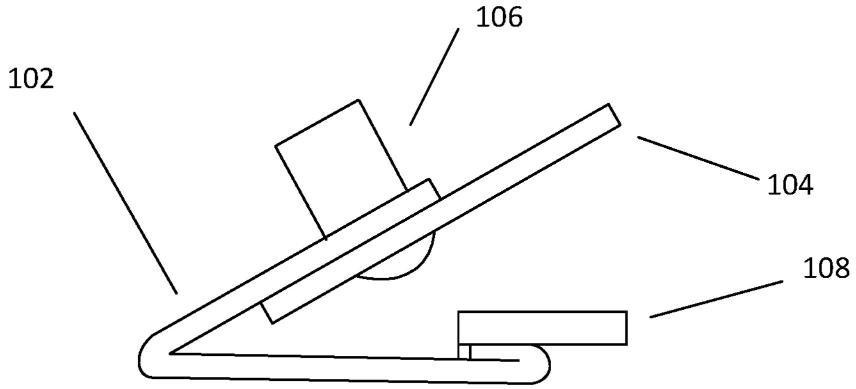
FIG. 1*b* depicts a side end view of an embodiment of the present device.

FIG. 1*b* depicts a side end view of an embodiment of the present device.

In use, a user can place the present device with a lower portion or an upper portion of a first elongated member 102 flush against a surface to be marked. A third elongated member 108 or a second elongated member 104 can then rest slightly above the surface to be marked. The exterior longitudinal edge of a second elongated member 104 or third elongated member 108 can then guide a brush, brush pen, or marker to produce a substantially straight line.

Figure 2A:
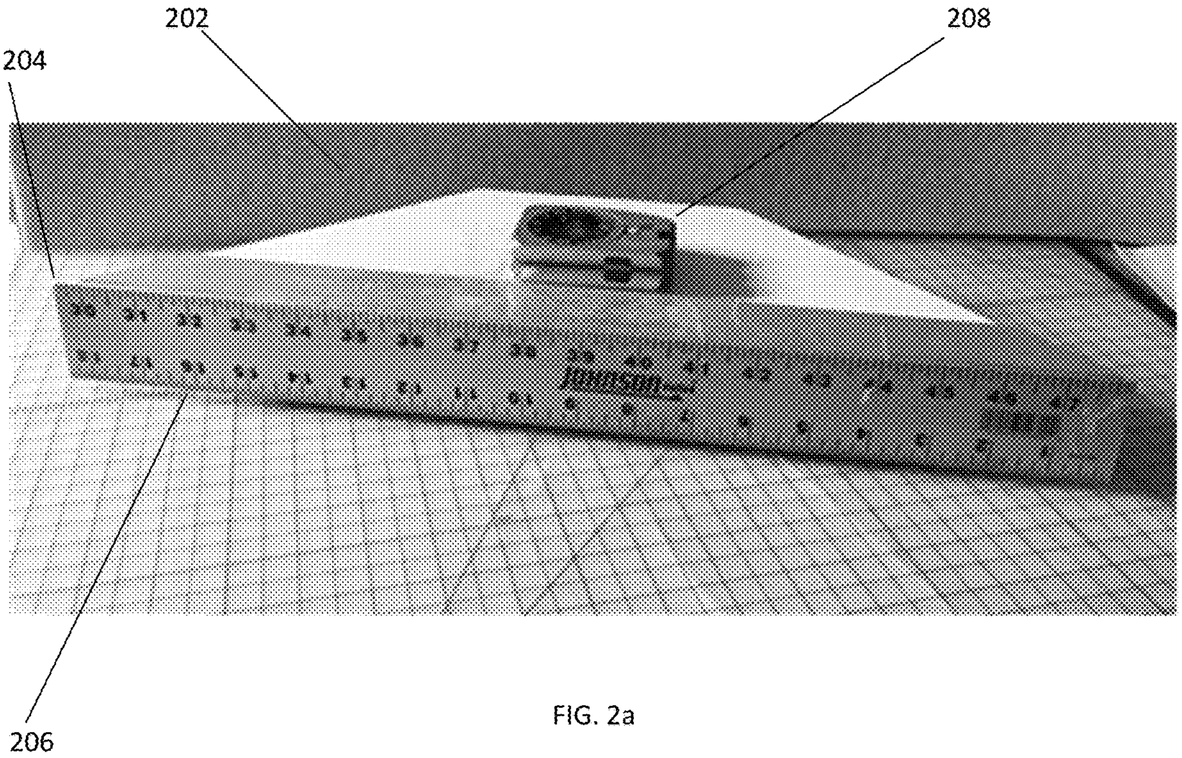
FIG. 2*a* depicts a perspective view of another embodiment of the present device.
Figure 3A:
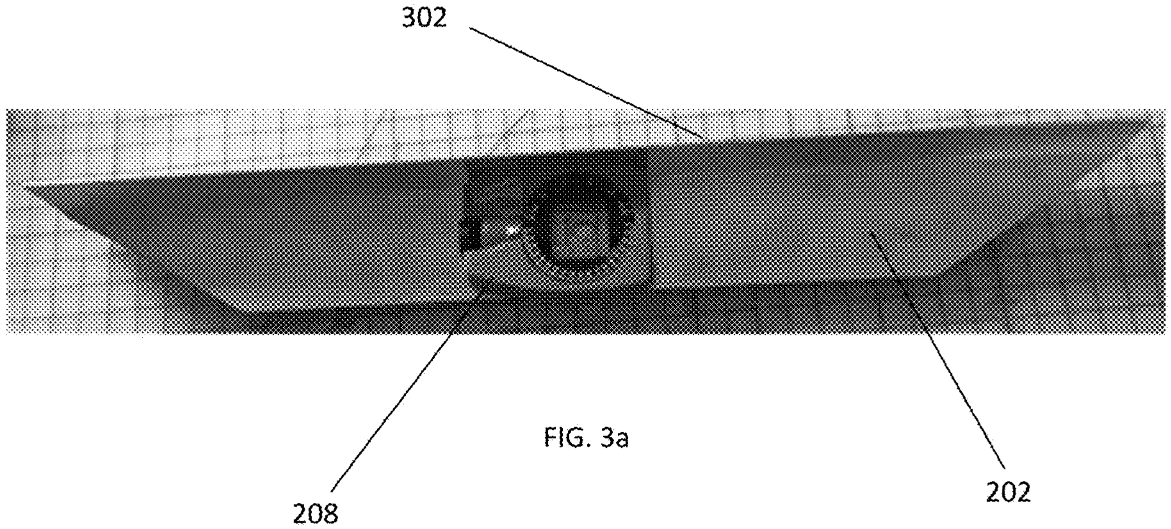
FIG. 3*a* depicts a top view of another embodiment of the present device.

FIG. 2*a* depicts a perspective view of another embodiment of the present device. In some embodiments, a substantially planar base 202 can have at least one elongated substantially straight edge 204. As shown in FIG. 3*a*, a base 202 can have a substantially trapezoidal geometry, but in other embodiments can have any other known and/or convenient configuration. In such embodiments, at least one elongated substantially straight edge 204 of a base 202 can be the longest edge of a base 202. An elongated member 206 can be removably connected to an elongated edge 204. In some embodiments, an elongated member 206 can have a substantially 90-degree longitudinal bend dividing it into two longitudinal regions, such that an elongated member 206 can laterally extend along its length substantially perpendicularly down from an elongated edge 204. As shown in FIG. 1*a*, an angular measuring device 208 can be positioned substantially parallel to and centrally on the top surface of a base 202. In other embodiments, an angular measuring device can be placed in any other known and/or convenient position. In some embodiments, a base 202 and elongated member 206 can be comprised of metal, polymer, wood, glass, or any other known and/or convenient material. In some embodiments, an angular measuring device can further comprise a suction device to take up excess ink and/or pigment from a drawing surface.

Figure 2B:
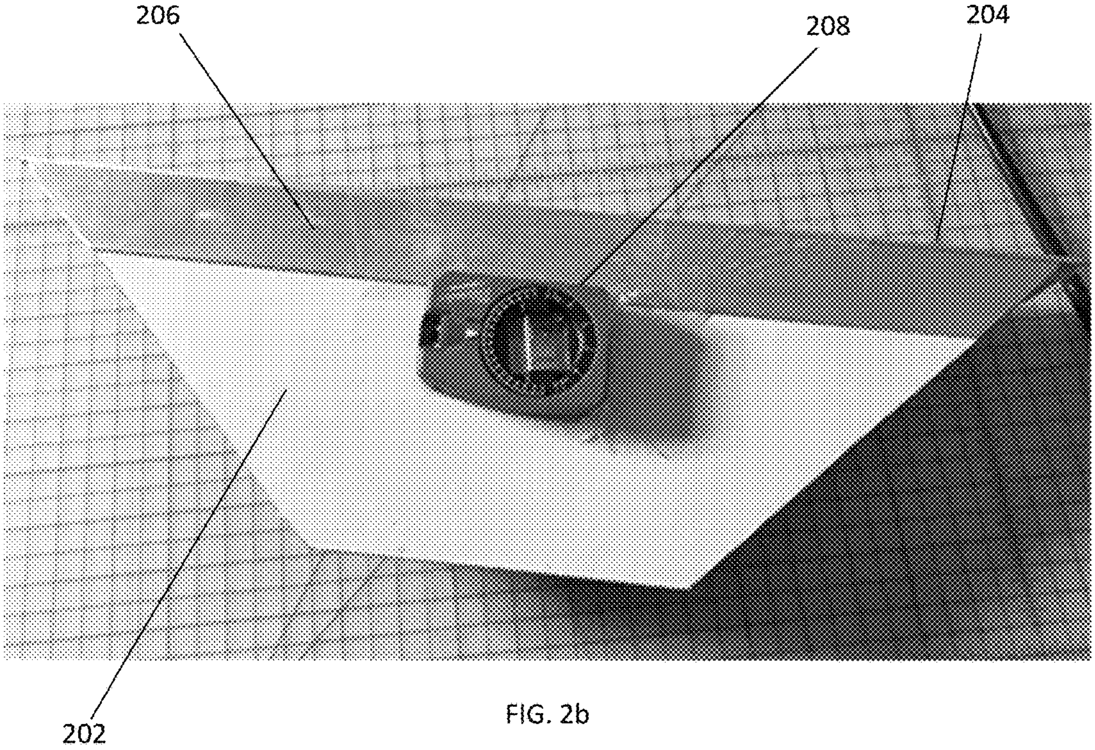
FIG. 2*b* depicts a top view of the embodiment shown in FIG. 2*a*.

FIG. 2*b* depicts a top view of the embodiment shown in FIG. 2*a*. As shown in FIG. 2*b*, an elongated member 206 can also extend laterally over an elongated edge 204, but in other embodiments can have any other known and/or convenient configuration. In some embodiments, the ends of an elongated member 206 can be shaped to sit flush with opposite edges of a base 202, but in other embodiments can have any other known and/or convenient configuration. As shown in FIG. 2*b*, an angular measuring device 208 can be positioned adjacent to the top edge of an elongated member 206. An angular measuring device 208 can be positioned such that an angular measurement can be viewed from the top, but in other embodiments can have any other known and/or position.

Figure 2C:
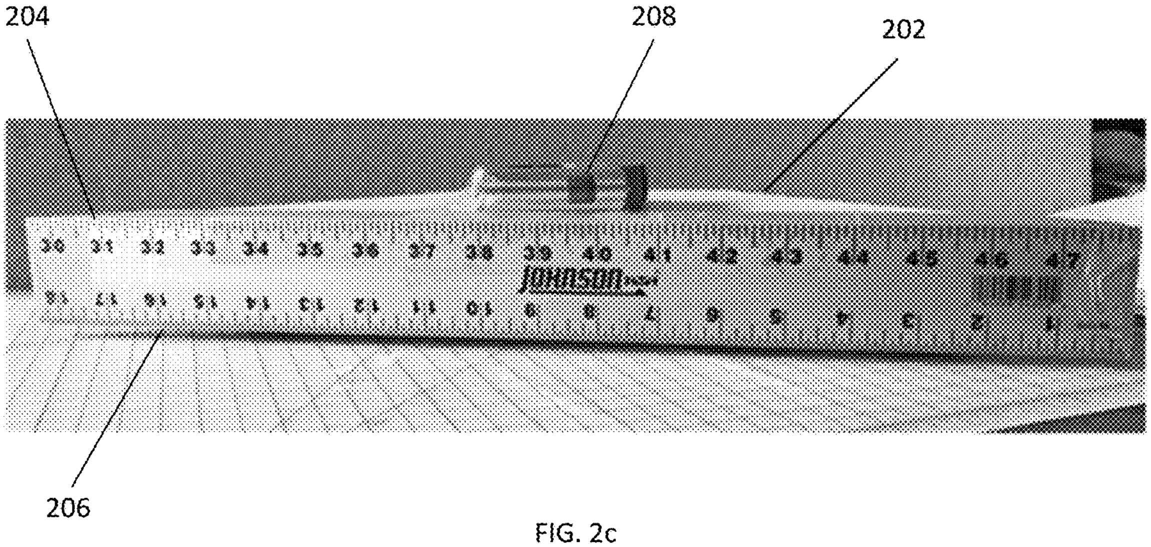
FIG. 2*c* depicts a front view of the embodiment shown in FIG. 2*a*.

FIG. 2*c* depicts a front view of the embodiment shown in FIG. 2*a*. As shown in FIG. 2*c*, an elongated member 206 can be marked with and known and/or convenient measurement indicia. The bottom edge of an elongated member 206 can extend down from a base 202 such that the bottom edge of an elongated member 206 can be substantially parallel to an elongated edge 204 of a base 202.

Figure 2D:
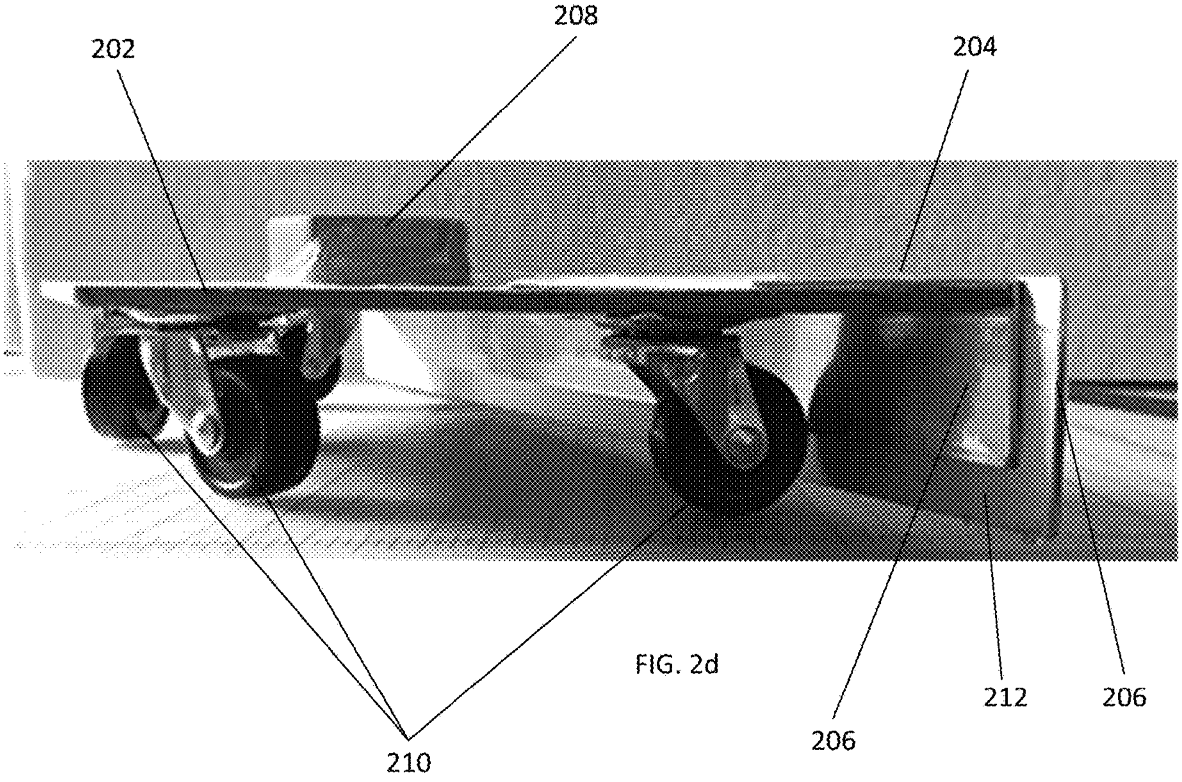
FIG. 2*d* depicts a back perspective edge view of the embodiment shown in FIG. 2*a*.

FIG. 2*d* depicts a rear perspective edge view of the embodiment shown in FIG. 2*a*. As shown in FIG. 2*d*, a plurality of roller devices 210 can be removably attached to the underside of a base 202. In some embodiments, an elongated member 206 can further comprise an additional elongated substantially planar member 212 removably attached to the downward-extending edge of an elongated member 206. In some embodiments, an elongated substantially planar member 212 can have a lower edge substantially parallel to the surface of a base 202, but in other embodiments can have any other known and/or convenient configuration. An elongated substantially planar member 212 can be marked with and known and/or convenient measurement indicia. In some embodiments roller devices 210 and an elongated substantially planar member 212 can be comprised of metal, polymer, wood, glass, or any other known and/or convenient material.

Figure 2E:
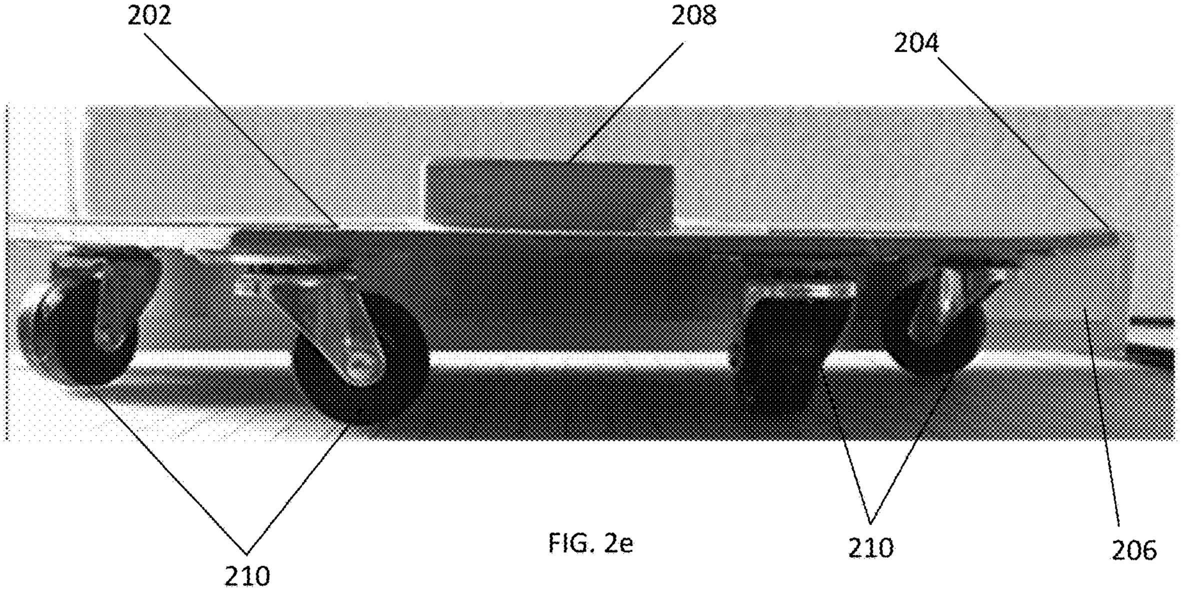
FIG. 2*e* depicts a rear view of the embodiment shown in FIG. 2*a*.

FIG. 2*e* depicts a rear view of the embodiments shown in FIG. 2*a*. In some embodiments, a plurality of rolling devices 210 can comprise at least three, but in other embodiments can have any other known and/or convenient quantity. In the embodiment shown, with a base 202 having a substantially trapezoidal geometry, a set of four rolling devices 210 can be positioned with each proximal to a corner of a trapezoid. In other embodiments, rolling devices 210 can be positioned in any other known and/or convenient configuration. As shown in FIG. 2*e*, a rolling device 210 can be a caster having a wheel-and-axle unit attached to a base 202 via a 360-degree connector, but in other embodiments can be a ball, bearing, roller, or any other known and/or convenient device.

Figure 2F:
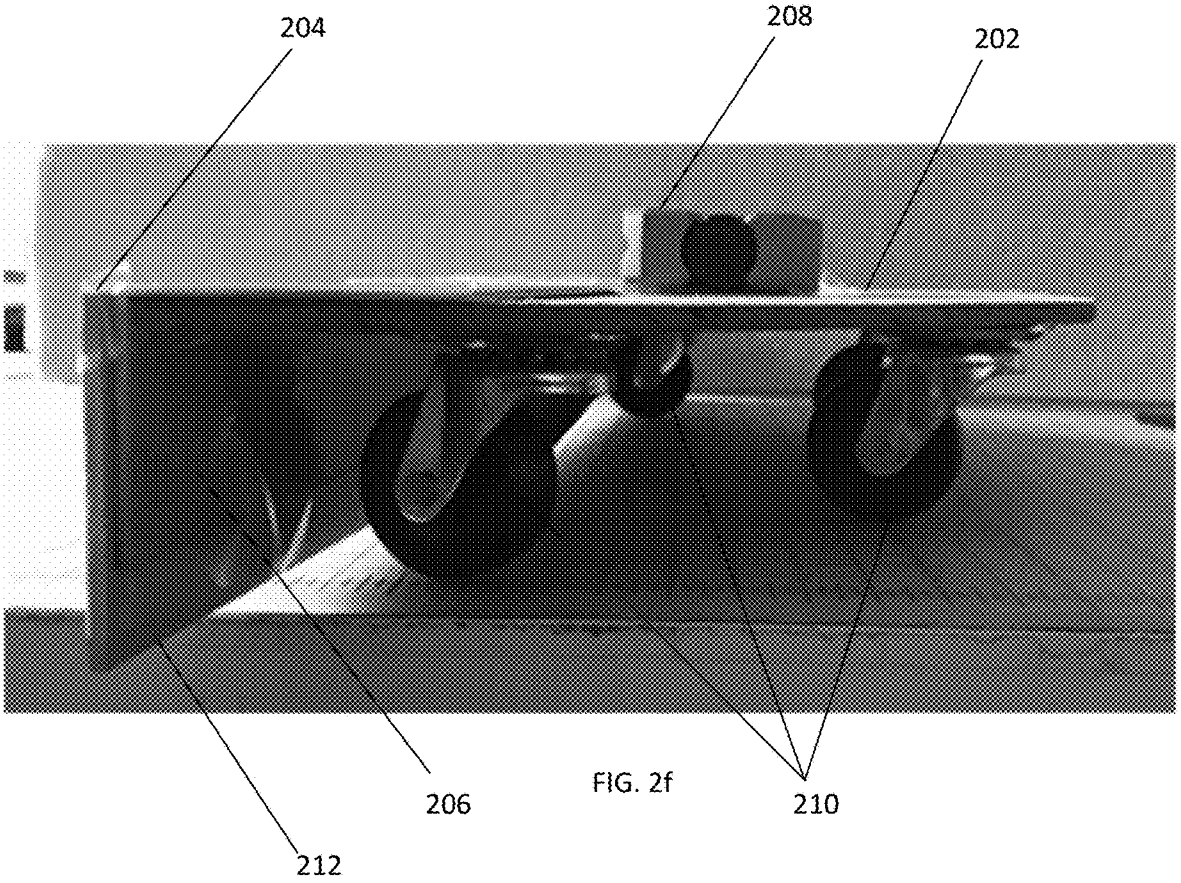
FIG. 2*f* depicts an opposite side view of the embodiment shown in FIG. 2*a*.

FIG. 2*f* depicts an opposite side view of the embodiment shown in FIG. 2*a*. As shown in FIG. 2*f*, a base 202 can be supported by a plurality of rolling devices 210. In the embodiment shown in FIG. 2*f*, two of four rolling devices 210 can support the rear edge of a base 202. In other embodiments, a single rolling device (1 of three) 210 can support the rear edge of a base 202.

Figure 2G:
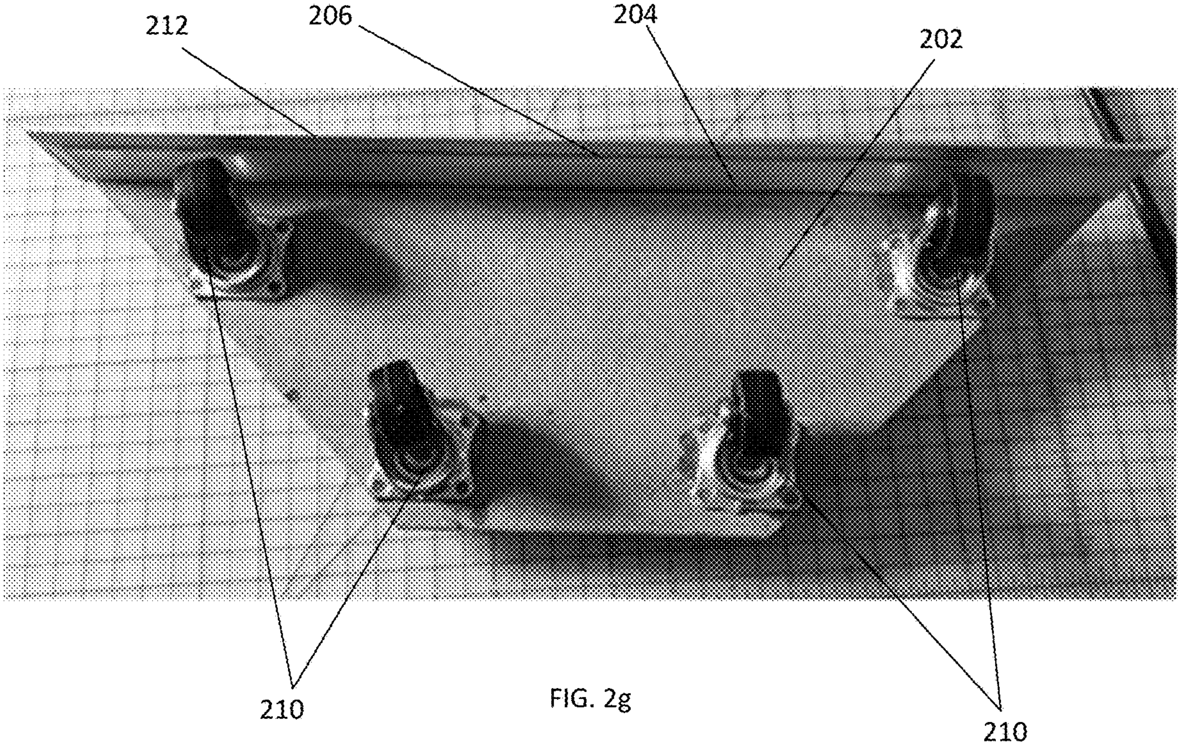
FIG. 2*g* depicts a bottom view of the embodiment shown in FIG. 2*a*.

FIG. 2*g* depicts a bottom view of the embodiment shown in FIG. 2*a*. As shown in FIG. 2*g*, a plurality of rolling devices 210 can be positioned on the underside of a base 202 such that each of four rolling devices 210 can be proximal to each corner of a trapezoidal base 202. In other embodiments, rolling devices 210 can be placed in any other known and/or convenient position.

Figure 2H:
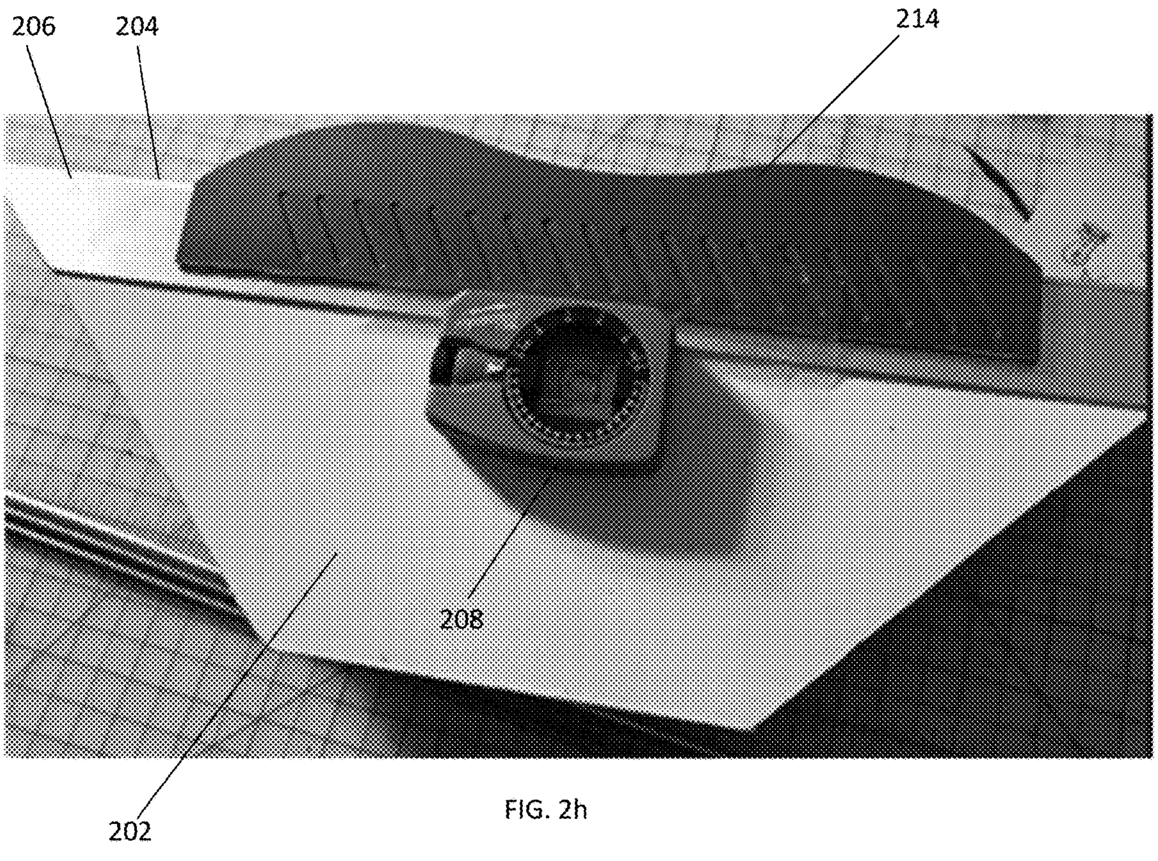
FIG. 2*h* depicts a top view of the embodiment shown in FIG. 2*a* with an optional attachment.

FIG. 2*h* depicts a top view of the embodiment shown in FIG. 2*a* with an optional shaped template 214. As shown in FIG. 2*h*, an optional shaped template 214 can have curves, but in other embodiments can have any other known and/or convenient configuration. As shown in FIG. 2*h*, an optional shaped template 214 can be removably attached to the top edge of an elongated member 206 along the elongated edge 204 of a base 202 such that an optional shaped template 214 can extend past an elongated edge 204 substantially parallel to the surface of a base 202. In other embodiments, an optional shaped template 214 can be removably attached to the top surface of a base 202. In some embodiments, an optional shaped template 214 can be comprised of metal, polymer, wood, glass, or any other known and/or convenient material.

FIG. 3*a* depicts a top view of another embodiment of the present device. In some embodiments, a base 202 can have a trapezoidal geometry, but in other embodiments can be any other known and/or convenient planar geometry. In such embodiments, a longitudinal section 302 of a base 202 can be bent upward substantially parallel to its longest edge to approximately 90-degrees. As shown in FIG. 3*a*, the width of a longitudinal section 302 can be approximately one-third of the width of a base 202, but in other embodiments can have any other known and/or convenient geometry. An angular measuring device 208 can be positioned substantially in the middle of a base 202, and as shown in FIG. 3*a*, can be adjacent to a longitudinal section 302, or located in any other known and/or convenient position.

Figure 3B:
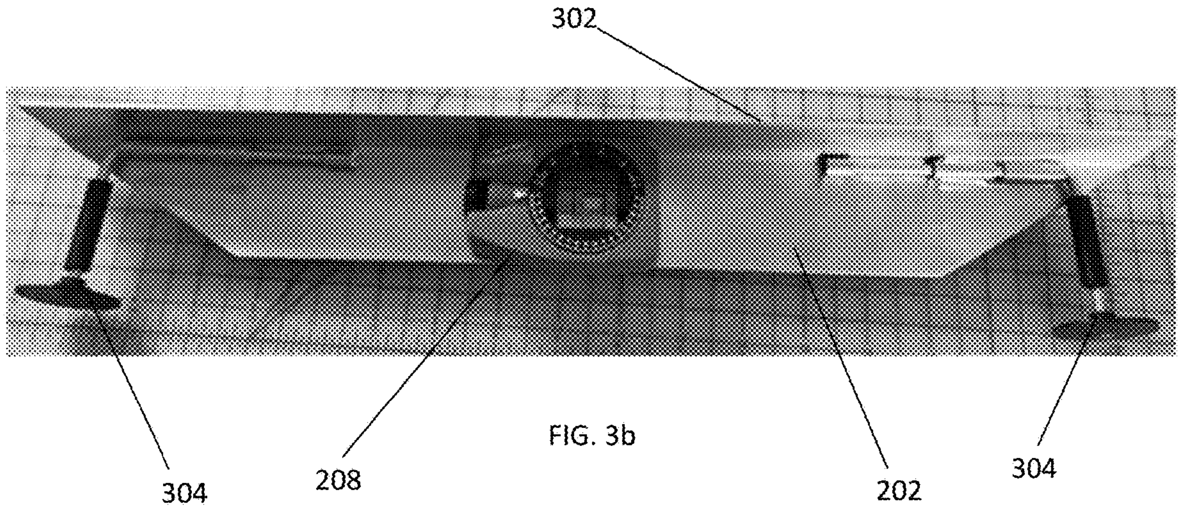
FIG. 3*b* depicts a top view of the embodiment shown in FIG. 3*a* with optional legs.

FIG. 3*b* depicts a top view of the embodiment shown in FIG. 3*a* with optional legs. In some embodiments, each leg 304 can have a first section 306 and a second section 308 separated by an approximately 90-degree bend. As shown in FIG. 3*b*, a pair of legs 304 can be removably and pivotally connected to each end of a base 202, substantially along the 90-degree bend. In other embodiments, legs 304 can be removably connected to a base 202 in any other known and/or convenient location by any other known and/or convenient device. In such embodiments, a first section 306 of a leg 304 can be proximal to a base 202, while a second section 308 can extend beyond the end of a base 202. As shown in FIG. 3*b*, a pair of legs 304 can be in a first position close to the ends of a base 202.

Figure 3C:
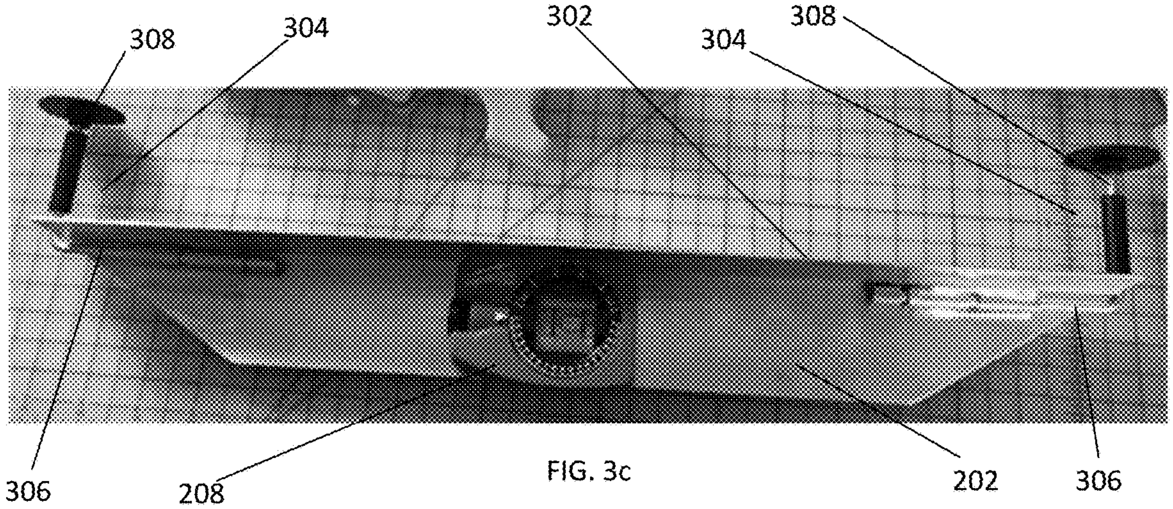
FIG. 3*c* depicts a top view of the embodiment shown in FIG. 3*a* with optional legs in an alternate position.

FIG. 3*c* depicts a top view of the embodiment shown in FIG. 3*a* with a pair of legs 304 in a second position. In a second position, a pair of legs 304 can be extended out from a pivotal connector beyond the ends of a base 202 and then rotated approximately 180-degrees such that the second section 308 of each leg 304 can extend substantially perpendicularly beyond the ends of a longitudinal section 302 of a base 202.

Figure 3D:
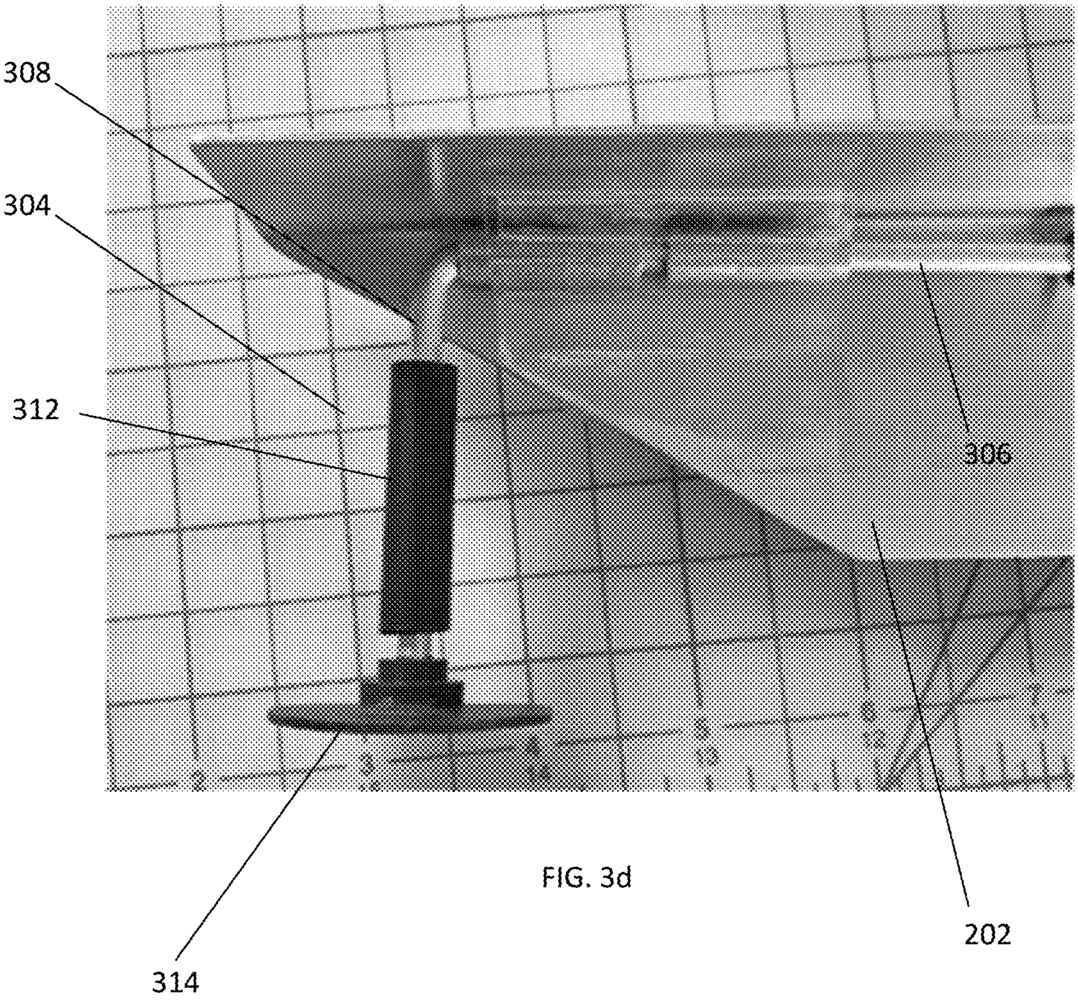
FIG. 3*d* depicts a detail of an optional leg of the embodiment shown in FIG. 3*a*.

FIG. 3*d* depicts a detail of an optional leg 304 of the embodiment shown in FIG. 3*a*. In some embodiments, a leg can be comprised of a first section 306 and a second section 308, separated by an approximately 90-degree bend at a point along its length. As shown in FIG. 3*d*, a first section 306 can form a central longitudinal axis of a pivot joint 310. A second section 308 can be surrounded by a substantially cylindrical sheath 312 and terminate in a foot 314, which can be removably attached to or integrated with the distal end of a leg 304. As shown in FIG. 3*d*, a foot 314 can have a substantially circular geometry, but in other embodiments can have any other known and/or convenient geometry.

Figure 3E:
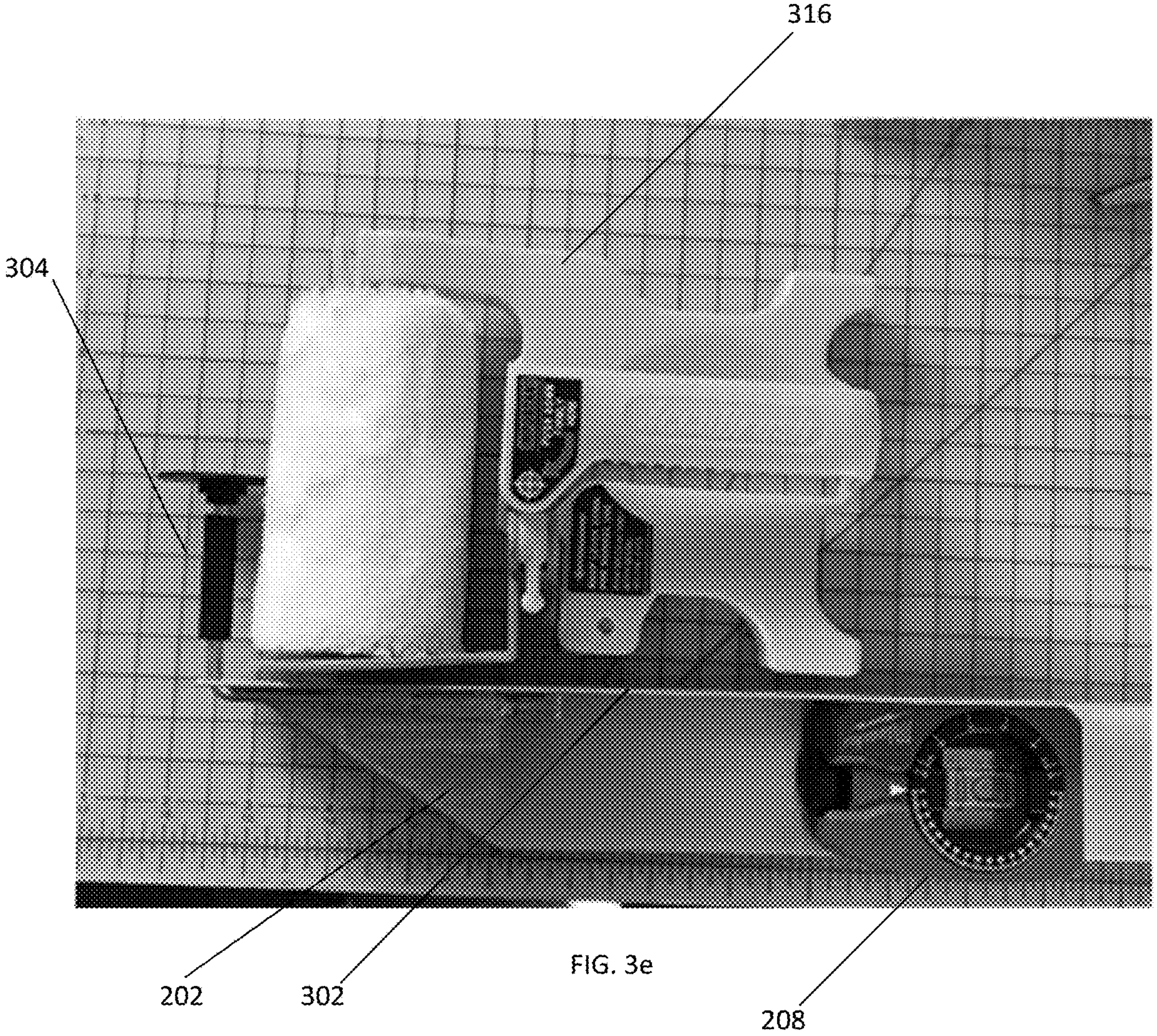
FIG. 3*e* depicts a top planar view of the embodiment shown in FIG. 3*a* in use with another painting device.
Figure 2A:
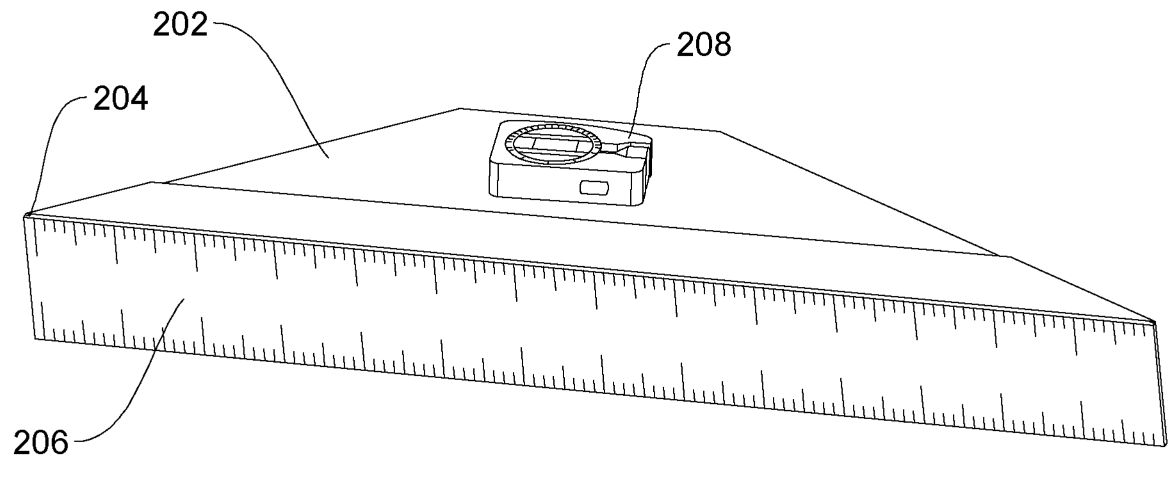
Figure 2B:
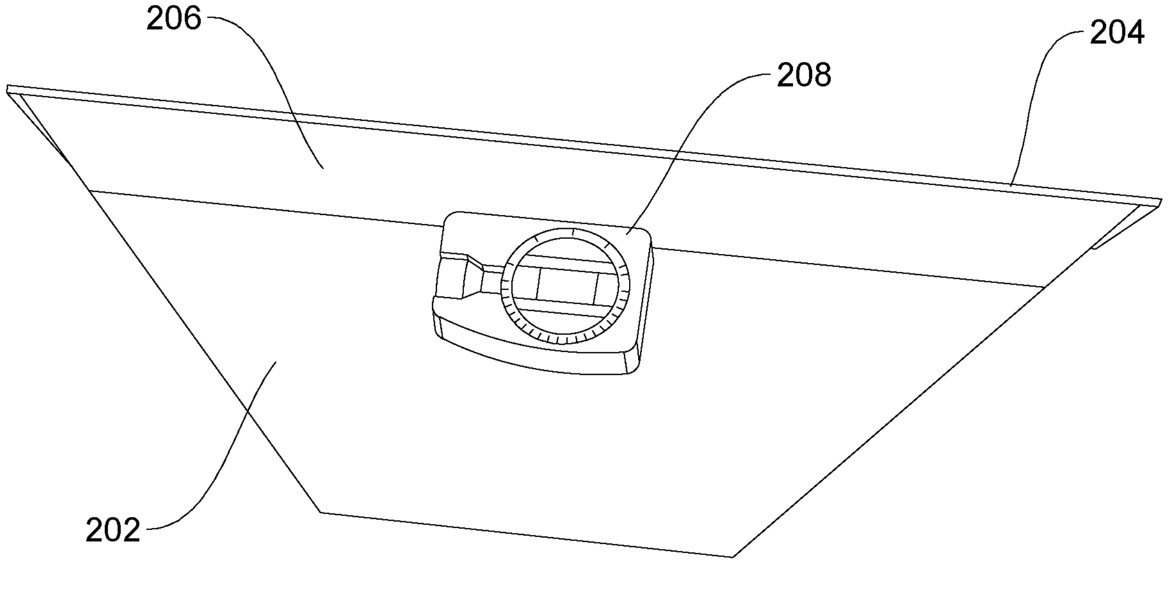
Figure 2C:
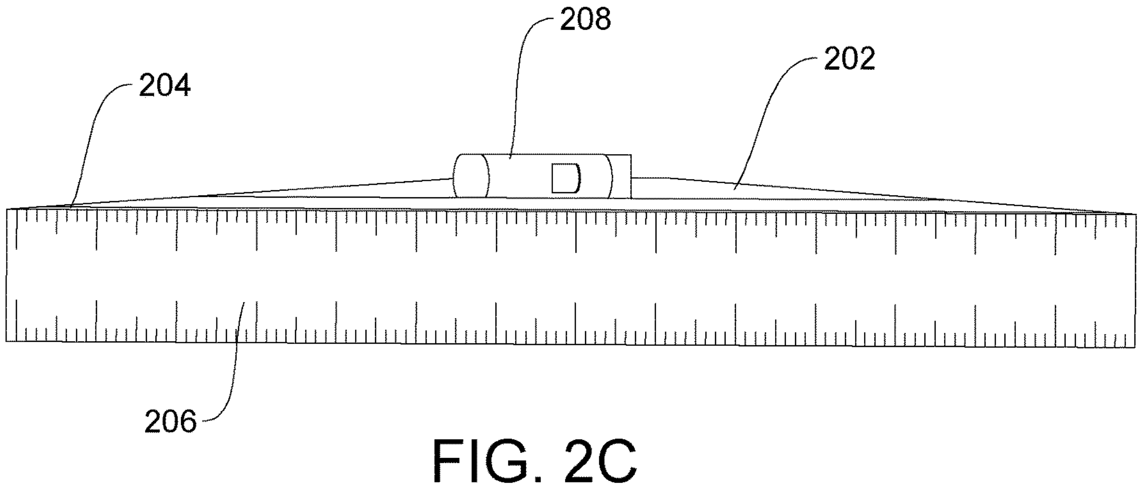
Figure 2D:
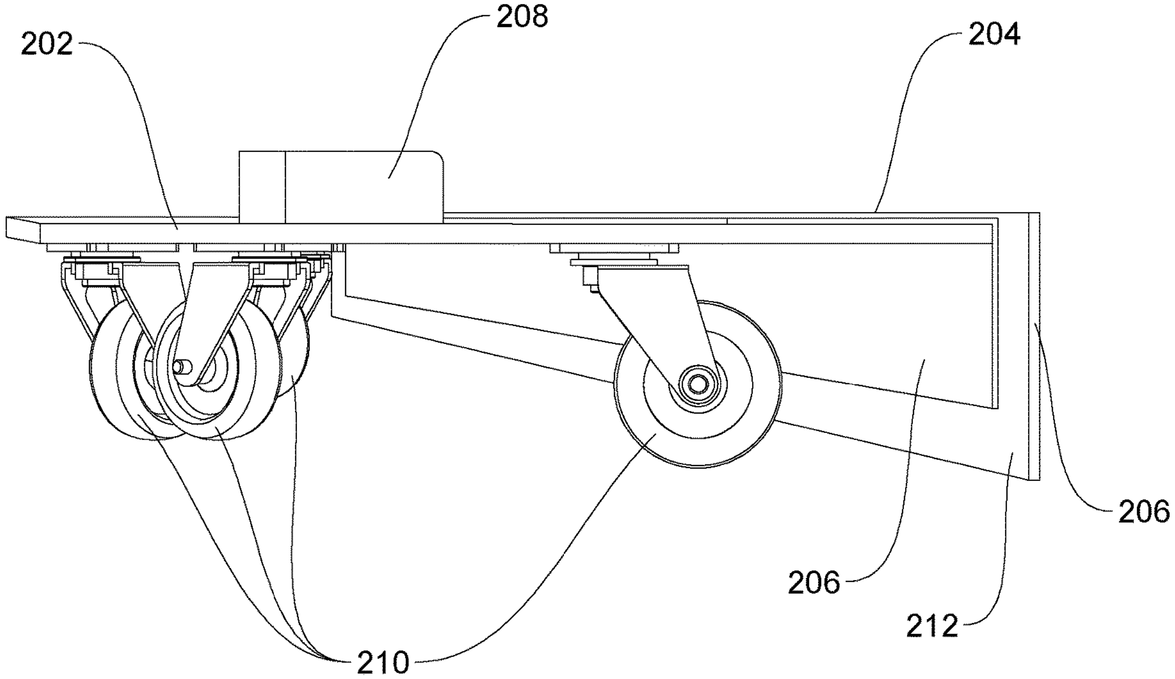
Figure 2E:
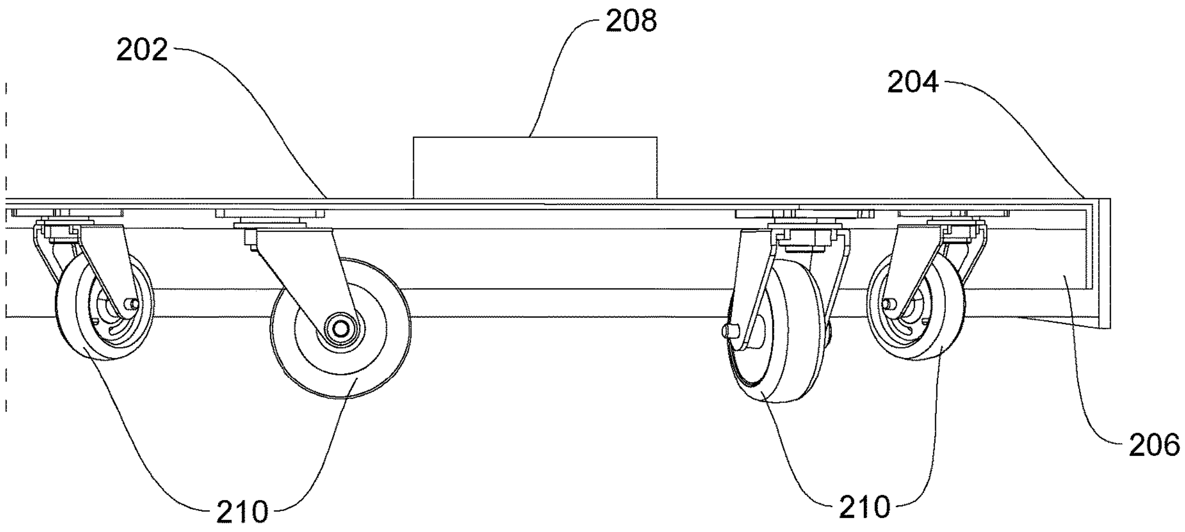
Figure 2F:
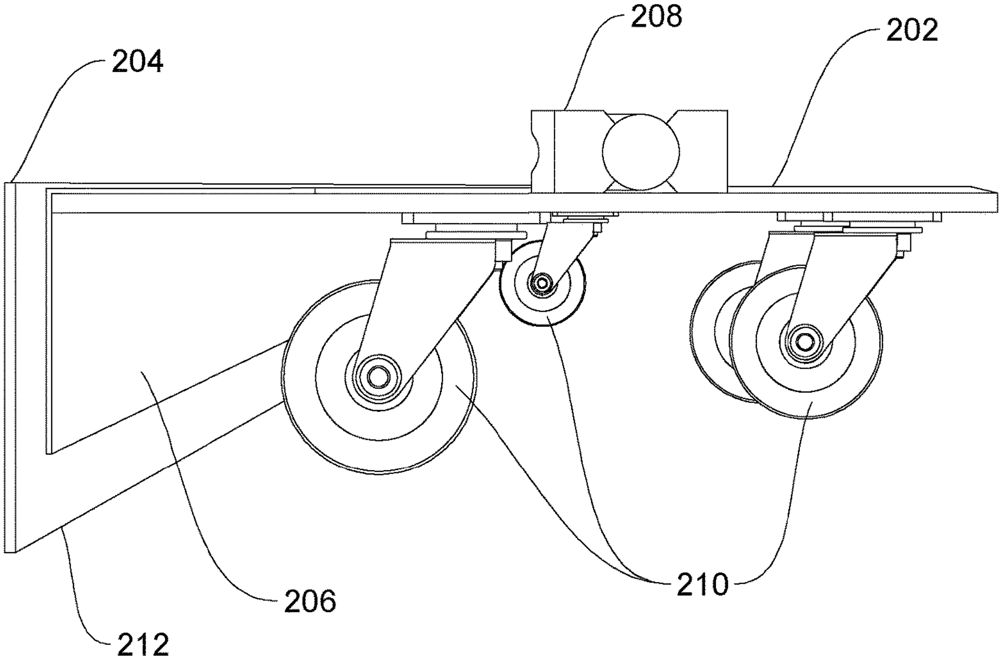
Figure 2G:
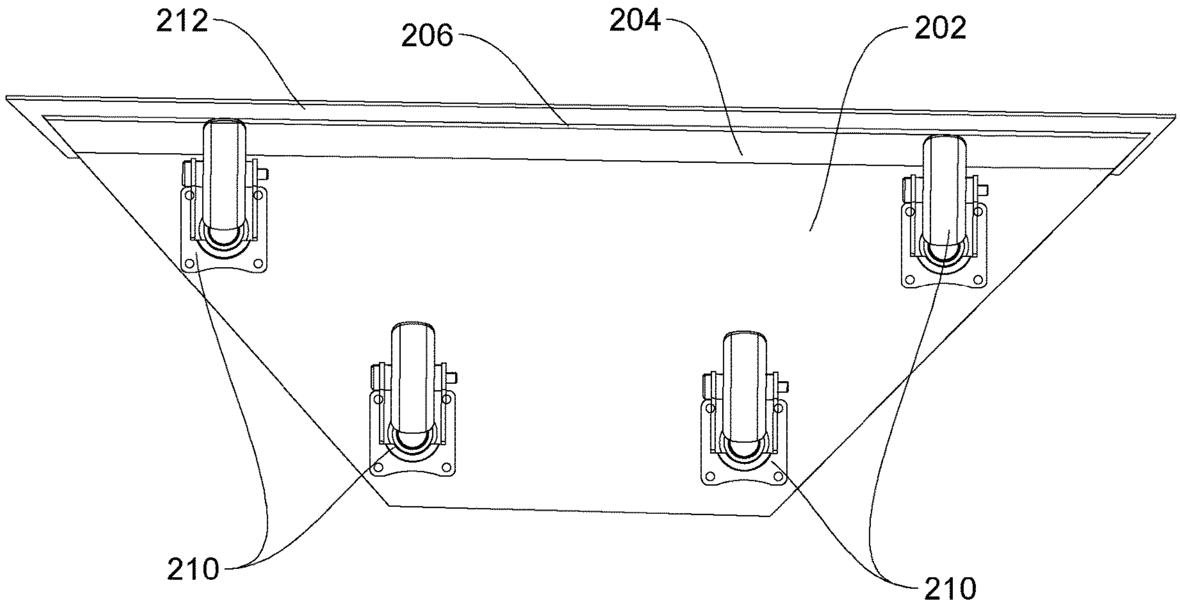
Figure 2H:
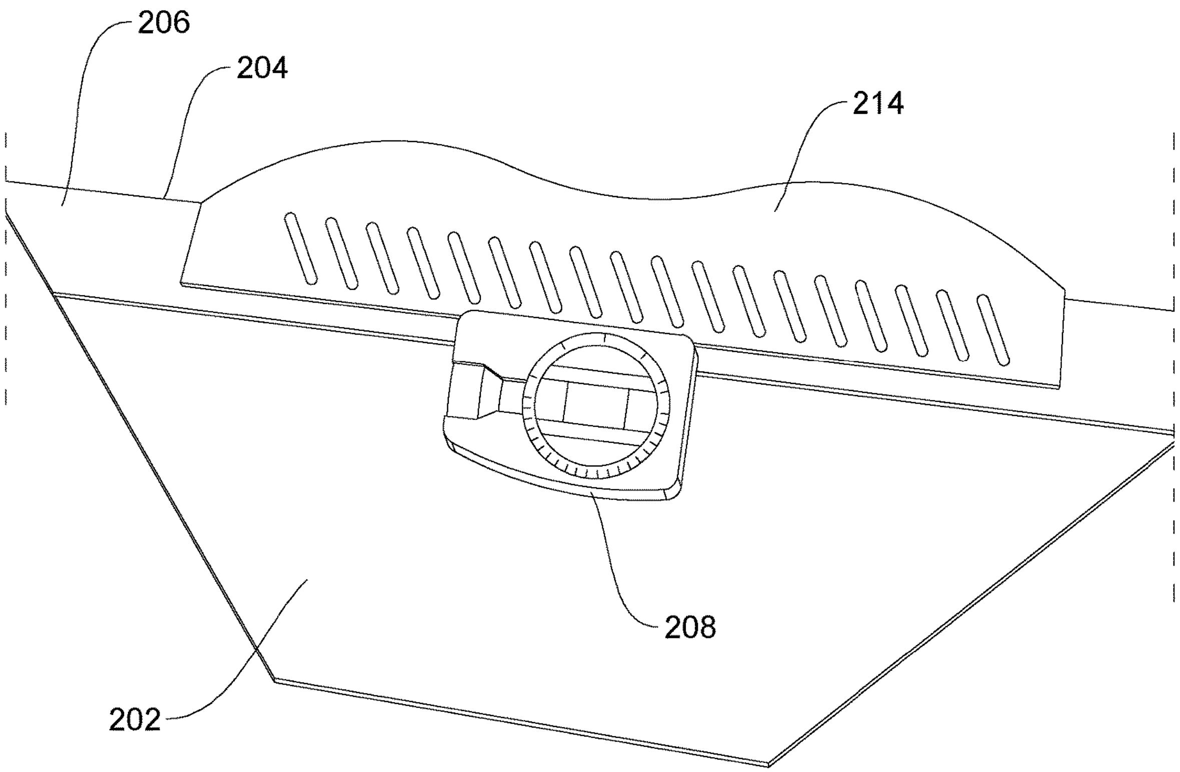
Figure 3A:
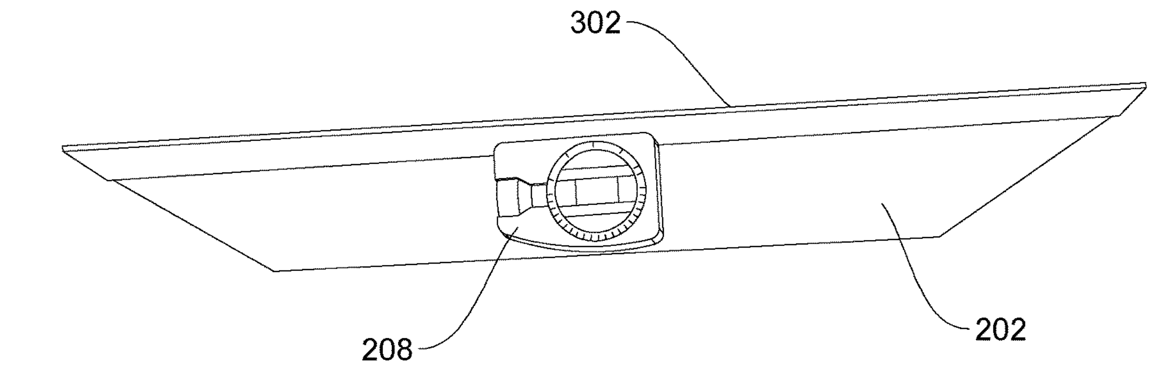
Figure 3B:
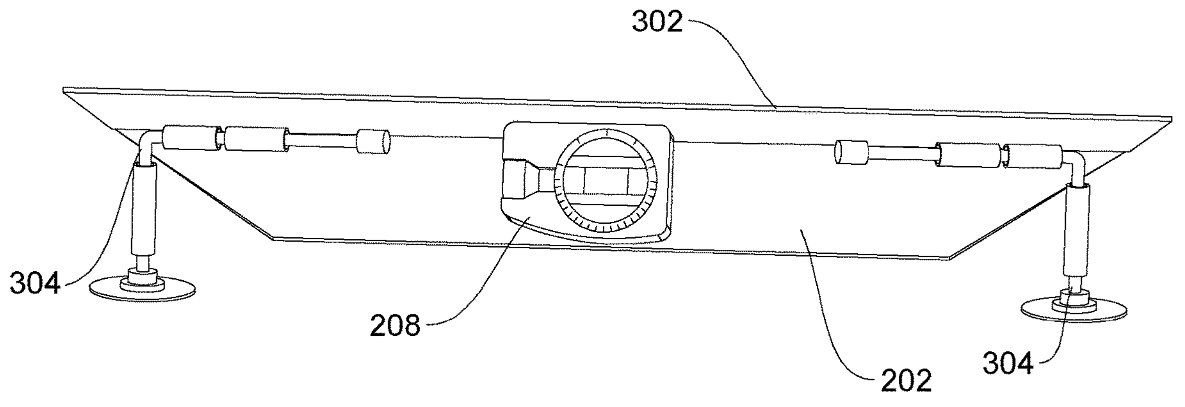
Figure 3C:
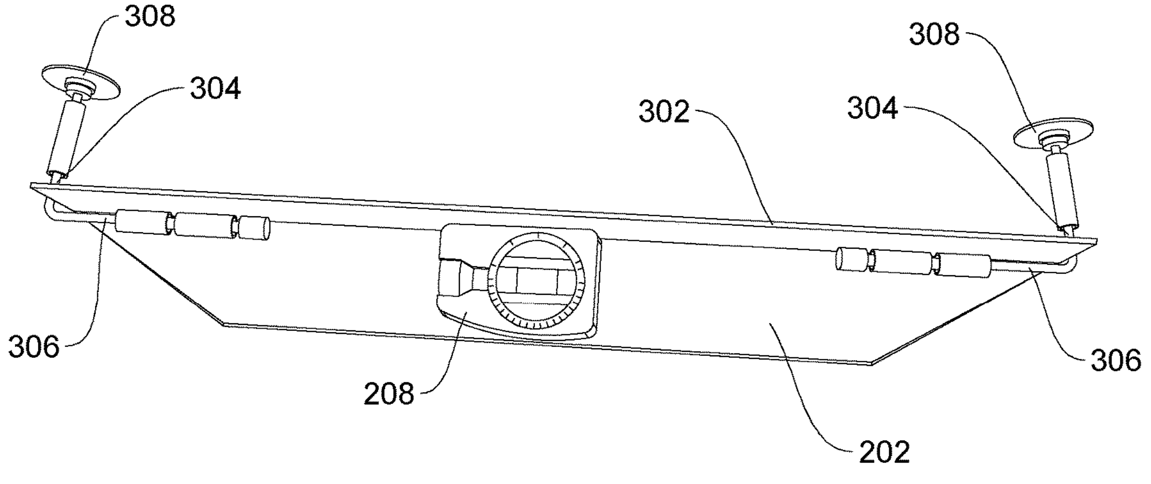
Figure 3D:
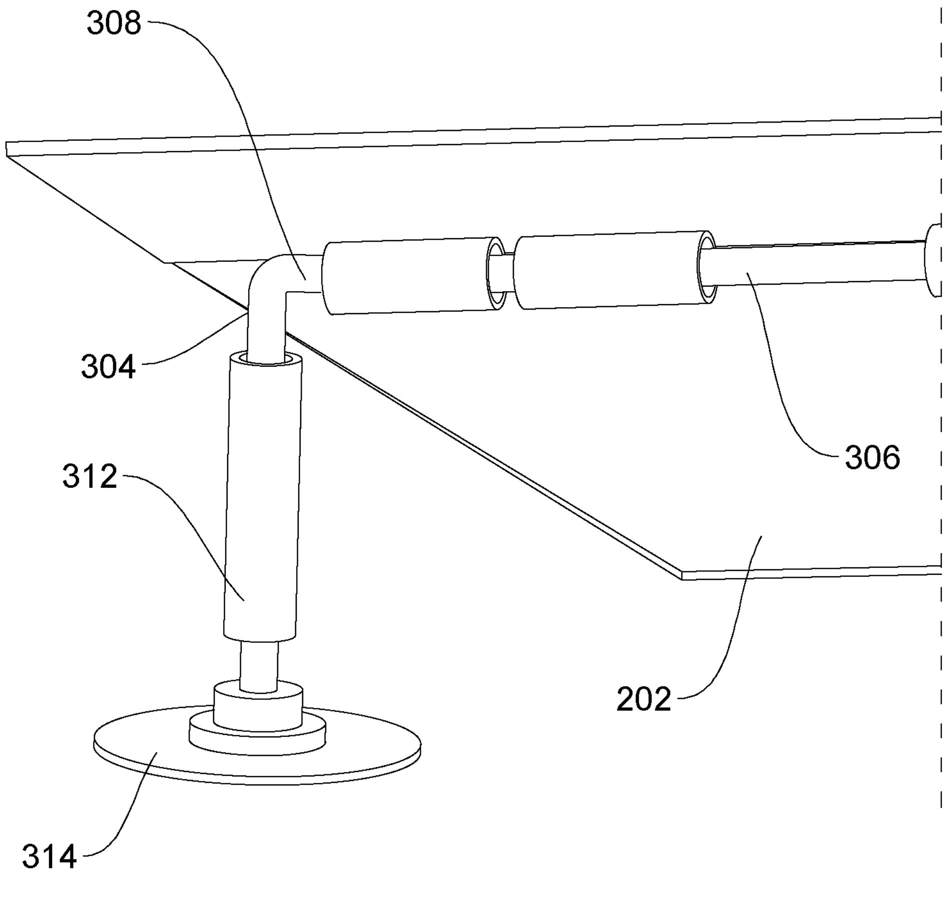
Figure 3E:
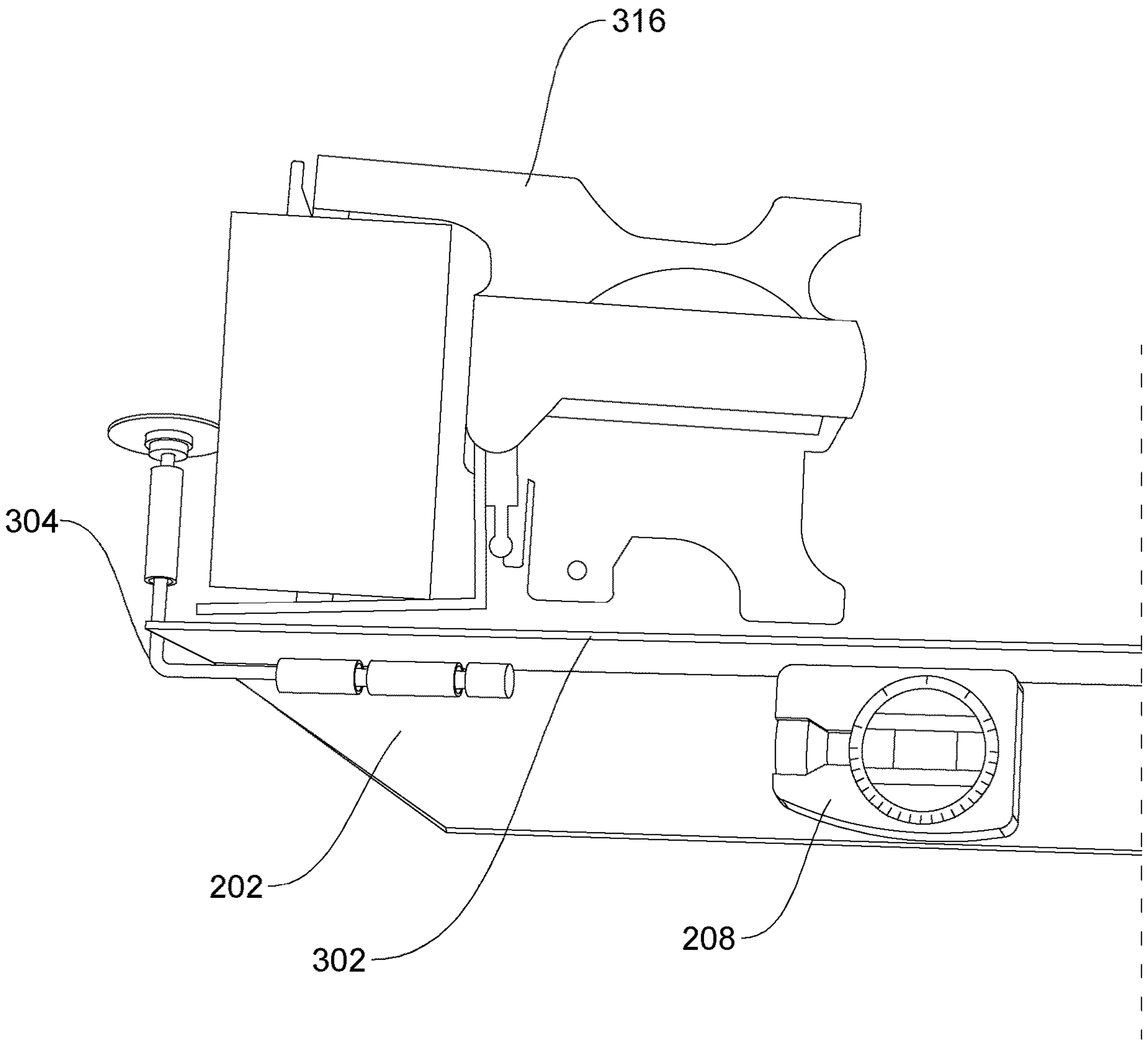

FIG. 3*e* depicts a top planar view of the embodiment shown in FIG. 3*a* in use with another painting device. Prior to use, legs 304 can be in a first position such that a first section 306 is pushed toward the center of a base 202 such that second sections 308 can be closer to each other. In use, a user can adjust the position of a base 202 relative to any known and/or convenient datum using an angular measurement device 108. When a base 202 is in position, legs 304 can be rotated into a second position such that the second sections 308 extend substantially perpendicularly beyond the longest edge of a base 202. A separate marking device 316 can be aligned with the longest edge of a base 202 such that it can move in a smooth path substantially parallel to the longest edge of a base 202.

Figure 3F:
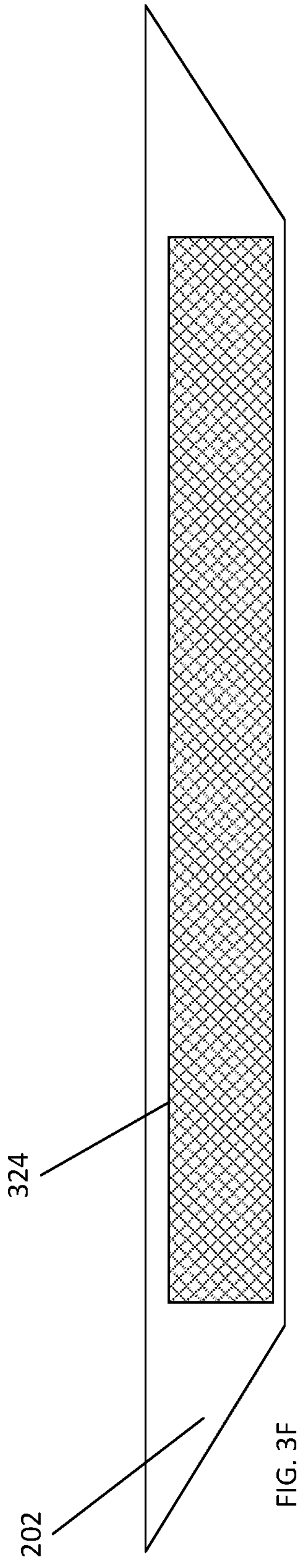
FIGS. 3F, 3L and 3M depict a partial views of the embodiment shown in FIG. 3*a*.
Figure 3L:
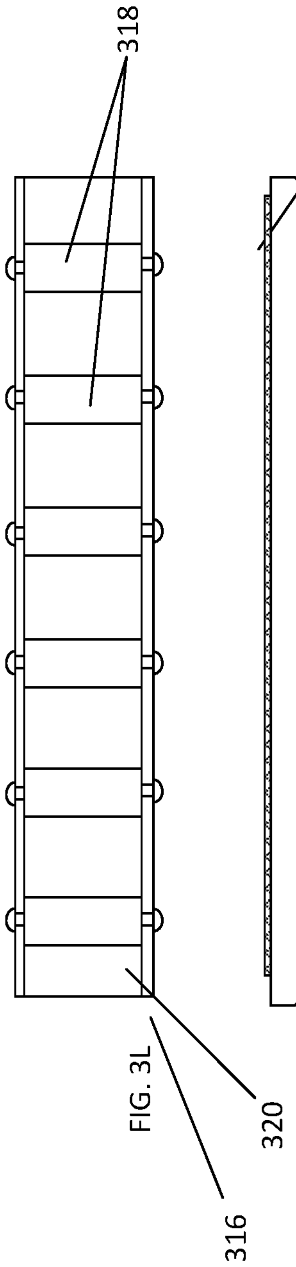
Figure 3M:
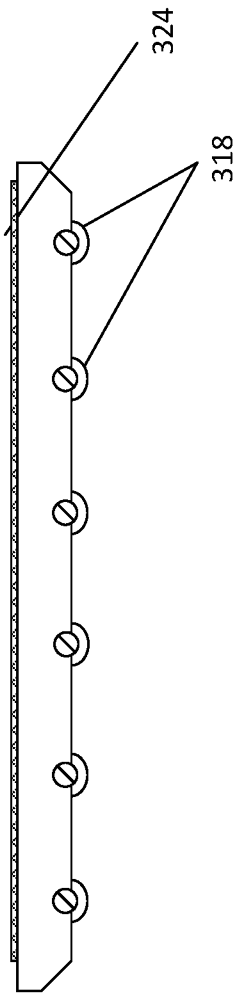

FIGS. 3F, 3L and 3M depict an assembly view of another embodiment of the present device. bottom view of the embodiment shown in FIG. 3*a*. A base plate 202 can be removably attached to a roller assembly 316. A plurality of rollers 318 can be housed in a tray 320. In some embodiments, a tray can have a substantially rectangular geometry, but in other embodiments can have any other known and/or convenient configuration. As shown in FIGS. 3F, 3L and 3M, a plurality of roller 318 can be oriented substantially perpendicular to the longitudinal axis of a tray 320 and removably connected to a tray 320 via a axle or any other known and/or convenient device. As shown in FIGS. 3F, 3L and 3M, the exterior planar surface of the tray 320 of a roller assembly 316 can be removably attached to the bottom surface of a base 202. In some embodiments, as in FIGS. 3F, 3L and 3M, a set of mating hook-and-loop regions 324, but in other embodiments can use adhesives, friction, fasteners or any other known and/or convenient removably attachment device. In use, a roller tray assembly 316 removably attached to a base 202 allows for movement of a base 202 along a surface.

Figure 3G:
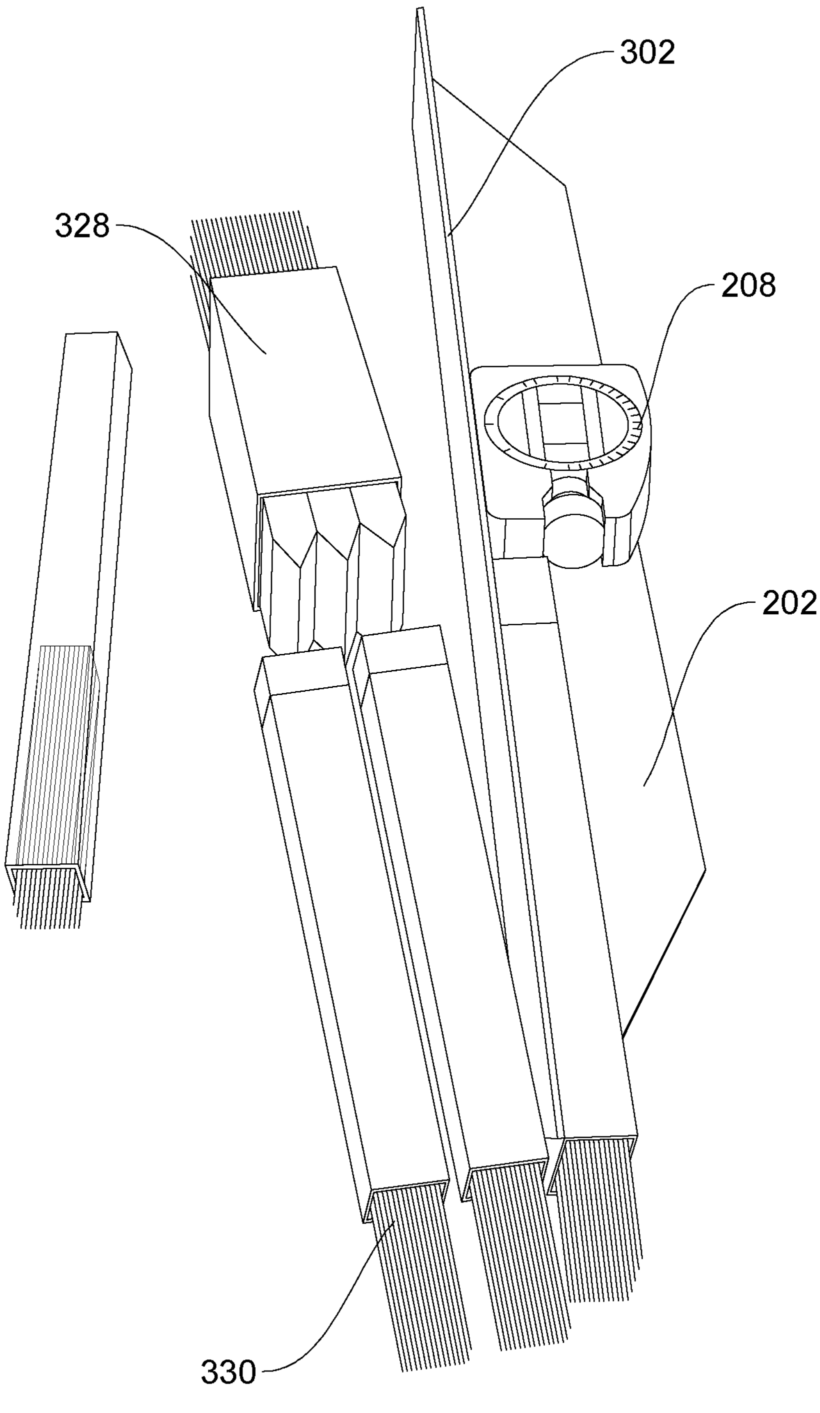
FIG. 3*g* depicts a perspective view of the embodiment shown in FIG. 3*a* with attachable brush cartridges.

FIG. 3*g* depicts a perspective view of the embodiment shown in FIG. 3*a* with optional brush cartridges 328. In some embodiments, at least one brush cartridge 328 can be removably attached to a base 202. As shown in FIG. 3*g*, a brush cartridge 328 can be positioned on the top surface of a base 202 adjacent to a longitudinal section 302. A brush cartridge 328 can be comprised of metal, polymer, or any other known and/or convenient material. A brush cartridge 328 can have a brush tip 330 that can extend out of at least one end of a brush cartridge 328. In some embodiments, a brush tip 330 can be comprised of bristles, foam, polymer, or any other known and/or convenient material. In use, a brush cartridge 328 can be positioned such that a brush tip 330 can extend over an end edge of a base 202. As a base 202 is moved along a planar surface, a brush cartridge 328 can draw a substantially straight line on a desired surface.

Figure 3H:
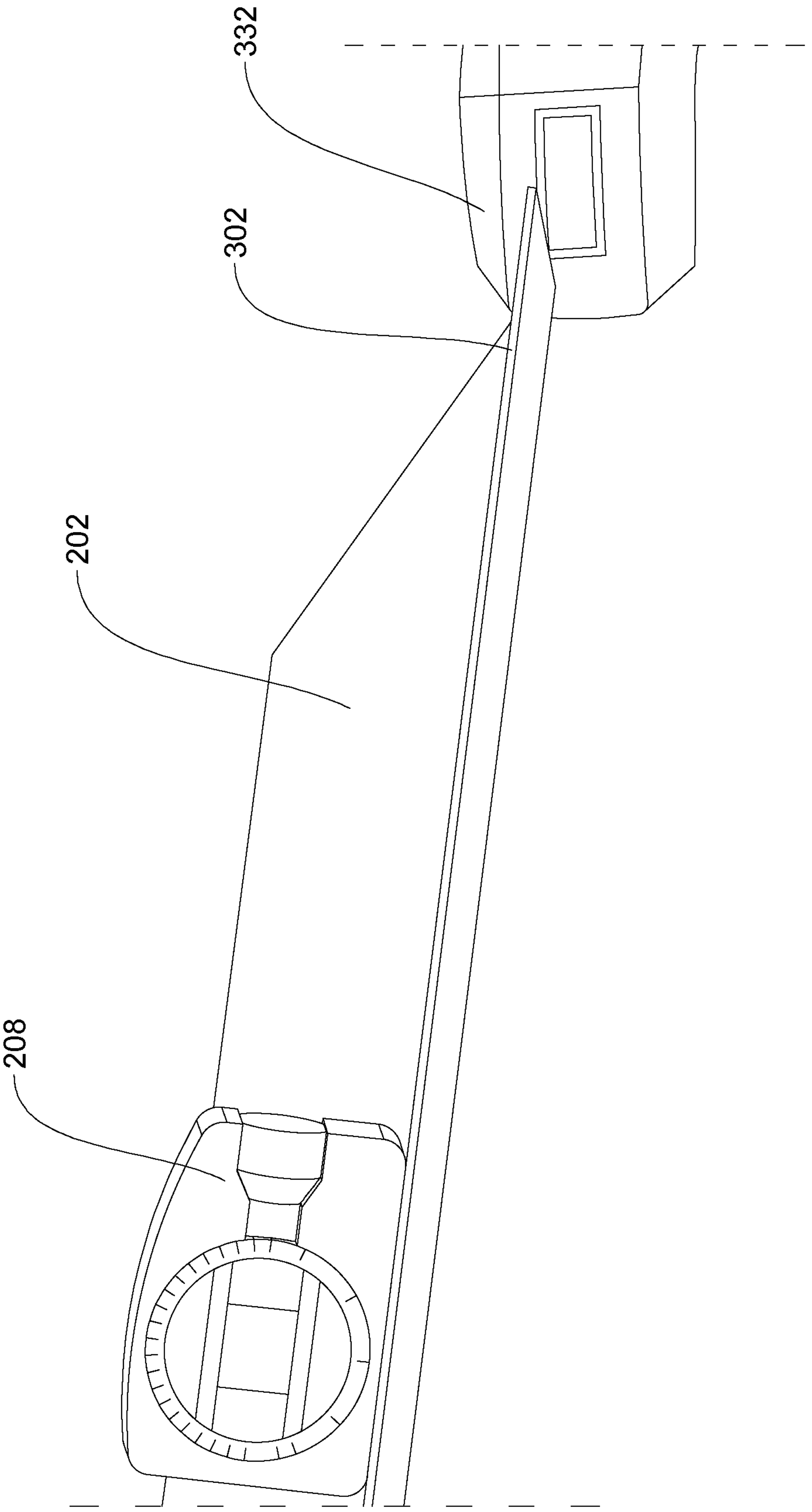
FIG. 3*h* depicts a top view of the embodiment shown in FIG. 3*a* with an optional laser attachment.

FIG. 3*h* depicts a top view of the embodiment shown in FIG. 3*a* with an optional laser device 332. As shown in FIG. 3*h*. a laser device can be removably connected to a base 202 such that an emitted laser can be substantially parallel to a longitudinal section 302. In use, a laser device 332 can be used to align and guide marking a substantially straight line along the longitudinal edge of a longitudinal section 302.

Figure 3I:
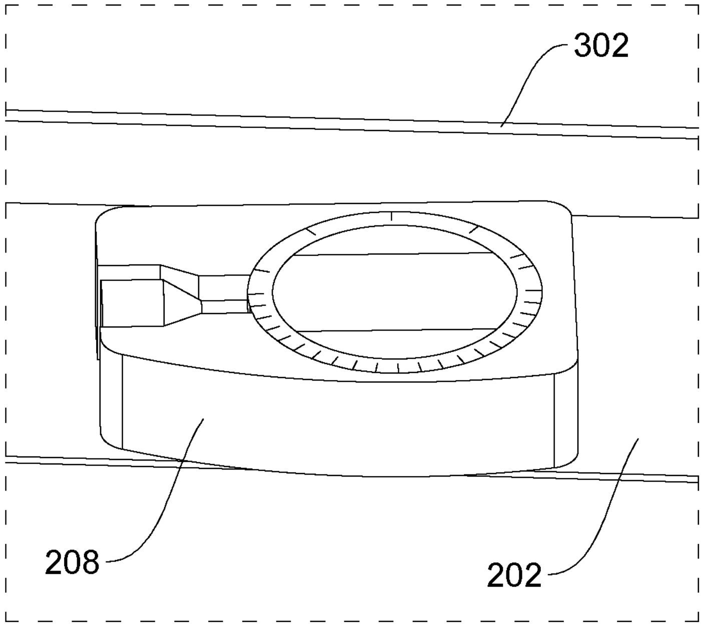
FIG. 3*i* depicts a detail view of an angle measuring device.

FIG. 3*i* depicts a detail view of an angular measuring device. As shown in FIG. 3*i*, an angular measuring device 108 can be located substantial at the midpoint along the length of a base 202. In other embodiments, an angular measuring device 108 can be placed at any other known and/or convenient location on a base 202.

Figure 3J:
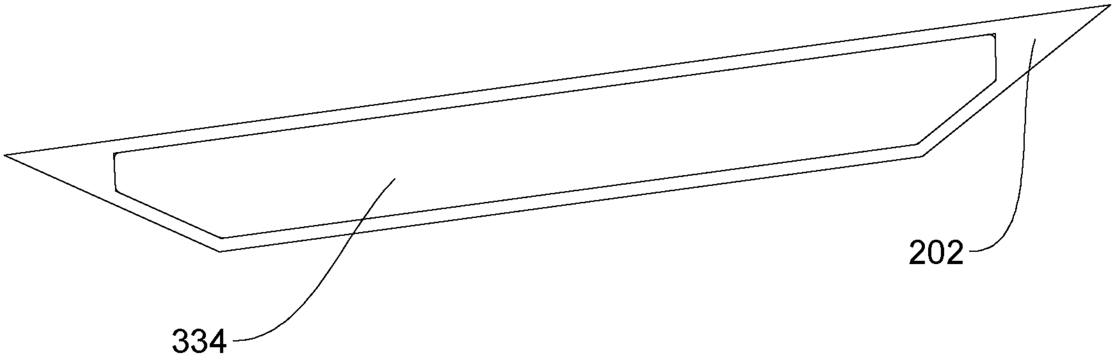
FIG. 3*j* depicts a bottom view of the embodiment shown in FIG. 3*a*.

FIG. 3*j* depicts a bottom view of an alternative bottom surface of the embodiment shown in FIG. 3*a*. In some embodiments, the bottom surface of a base 202 can further comprise a non-slip surface 334.

Figure 3K:
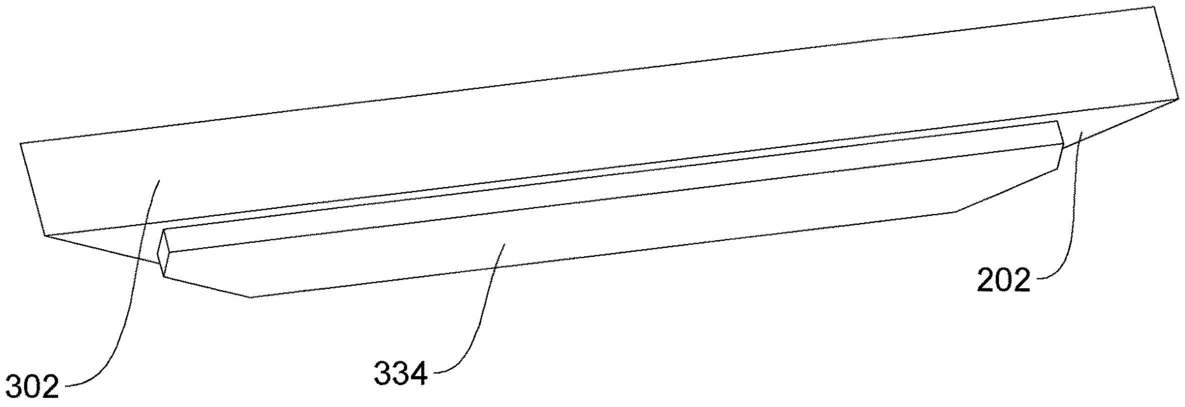
FIG. 3*k* depicts a rear view of the embodiment shown in FIG. 3*j*.

FIG. 3*k* depicts a rear view of the embodiment shown in FIG. 3*j*. As shown in FIG. 3*k*, a non-slip surface can be removably attached to a base 202 via an adhesive, fasteners, or any other known and/or convenient device.

Figure 4A:
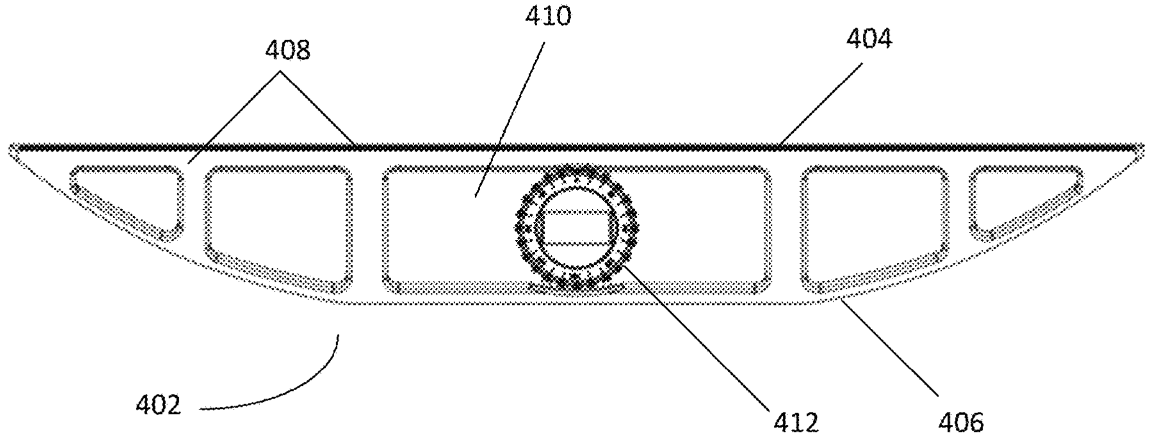
FIG. 4*a* depicts a top planar view of another embodiment of the present device.

FIG. 4*a* depicts a top planar view of another embodiment of the present device. In some embodiments, a framework 402 can have a substantially straight front region 404 and a rear region 406. As shown in FIG. 4*a*, a rear region 406 can be substantially curved, angular, or any other known and/or convenient configuration. At least one cross-support 408 can connect a front region 404 and a rear region 406. As shown in FIG. 4*a*, a cross support can extend substantially perpendicularly between a front region 404 and a rear region 406, but in other embodiments can have any other known and/or convenient configuration. A planar base member 410 can extend along at least a portion of the bottom of a framework 402. An angular measurement device 412 can be removably attached to a planar base member 410 substantially at the centerpoint of a planar base member 410 and framework 402. A framework 402 and a planar base member 410 can be comprised of metal, polymer, or any other known and/or convenient material, and can be separate or integrated components.

Figure 4B:
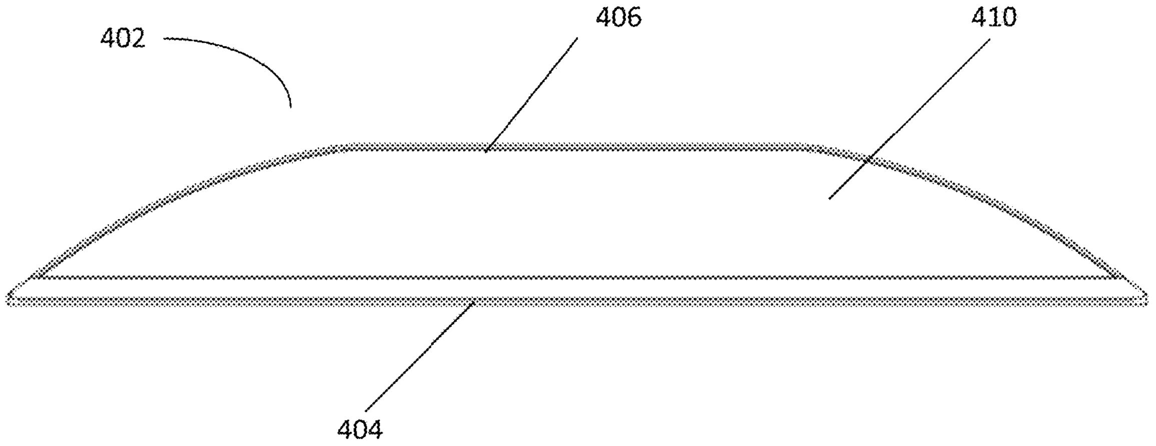
FIG. 4*b* depicts a bottom planar view of the embodiment shown in FIG. 4*a*.

FIG. 4*b* depicts a bottom planar view of the embodiment shown in FIG. 4*a*. As shown in FIG. 4*b*, a planar base member 410 can extend substantially along the entirety of the base area of a framework 402, but in other embodiments can cover any portion of the base area. As shown in FIG. 4*b*, a rear region 406 can be comprised of a pair of curved sections joined in the middle by a substantially linear section, but in other embodiments can have any other known and/or convenient geometry.

Figure 4C:
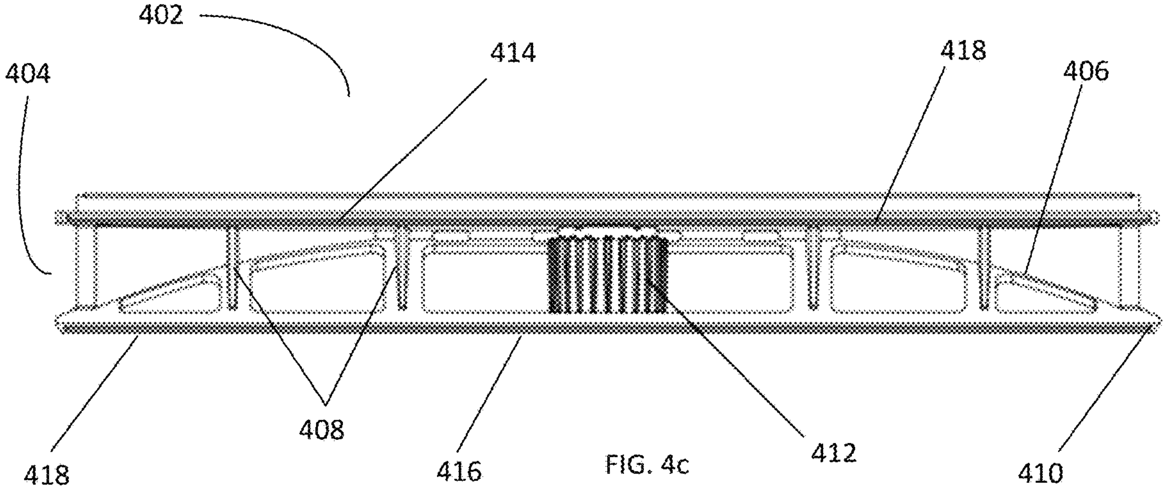
FIG. 4*c* depicts a front view of the embodiment shown in FIG. 4*a*.

FIG. 4*c* depicts a front view of the embodiment shown in FIG. 4*a*. As shown in FIG. 4*c*, a front region 404 of a framework 402 can further comprise a top edge 414 and a bottom edge 416, which can be substantially parallel to each other. In some embodiments, a top edge 414 and a bottom edge 416 can have further edge extensions 418 substantially along the length of each edge.

Figure 4D:
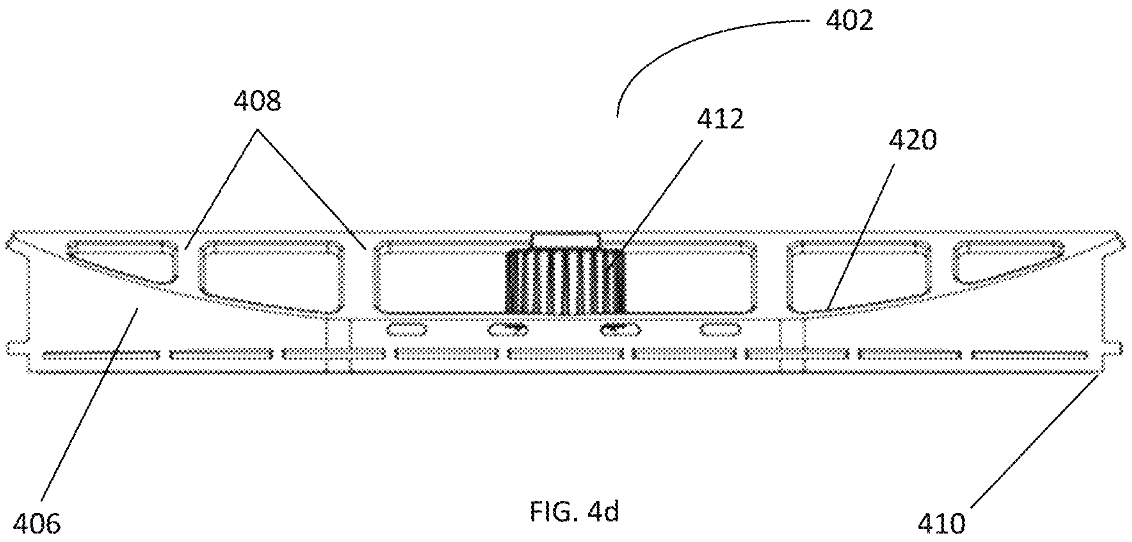
FIG. 4*d* depicts a rear view of the embodiment shown in FIG. 4*a*.

FIG. 4*d* depicts a rear view of the embodiment shown in FIG. 4*a*. In some embodiments, a rear region 406 can have a top edge 420 curved in a direction substantially perpendicular to a base member 410. In other embodiments, a rear region 406 can have any other known and/or convenient configuration.

Figure 4E:
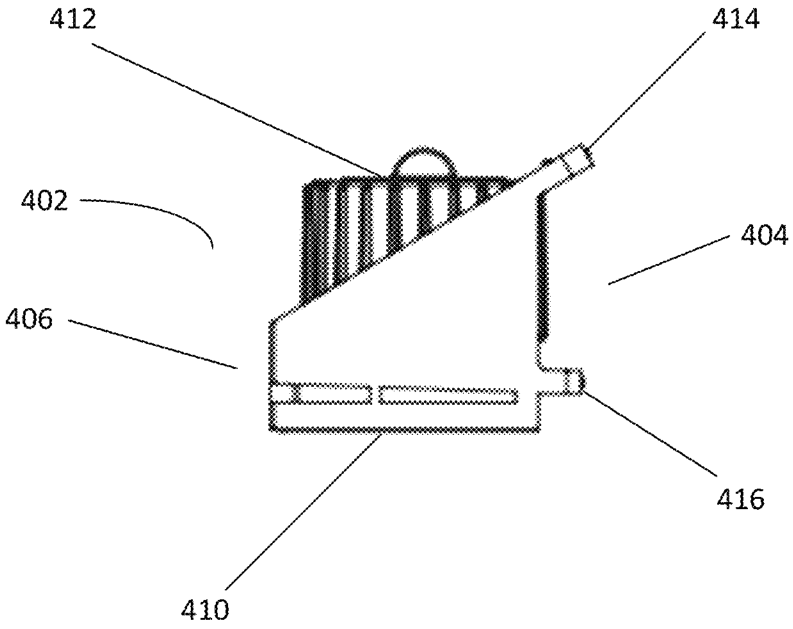
FIG. 4*e* depicts a side view of the embodiment shown in FIG. 4*a*.

FIG. 4*e* depicts a side view of the embodiment shown in FIG. 4*a*. In the embodiment shown in FIG. 4*e*, a rear region 406 can be shorter than a front region 404, but in other embodiments can have any other known and/or convenient configuration. In some embodiments, a top edge 414 can extend at an upward acute angle relative to a planar base member 410, while a bottom edge 416 can extend substantially parallel to a planar base member 410. In other embodiments a top edge 414 and a bottom edge 416 can extend at any other known and/or convenient angles relative to a planar base member 410.

Figure 4F:
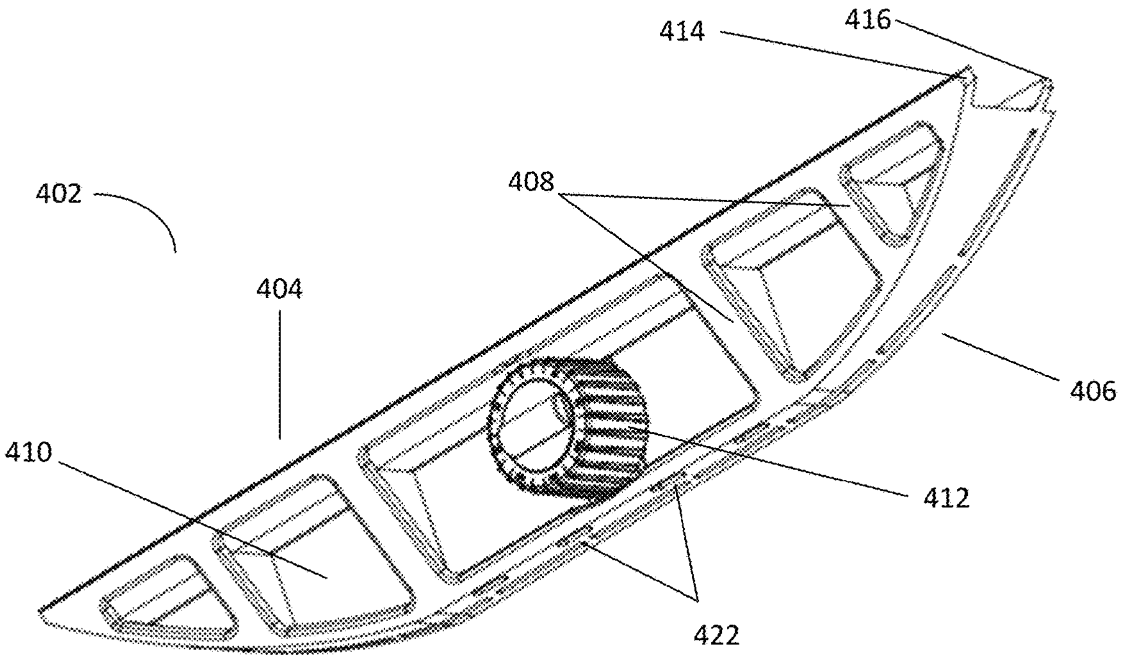
FIG. 4*f* depicts a perspective view of the embodiment shown in FIG. 4*a*.

FIG. 4*f* depicts a perspective view of the embodiment shown in FIG. 4*a*. As shown in FIG. 4*f*, cross supports 408 can also extend downward to connect with the top surface of a planar base member 410, but in other embodiments can extend only between a front region 404 and a rear region 406. Cutouts 422 can also be placed in any known and/or convenient location along a rear member 406 to reduce weight and material usage.

Figure 4G:
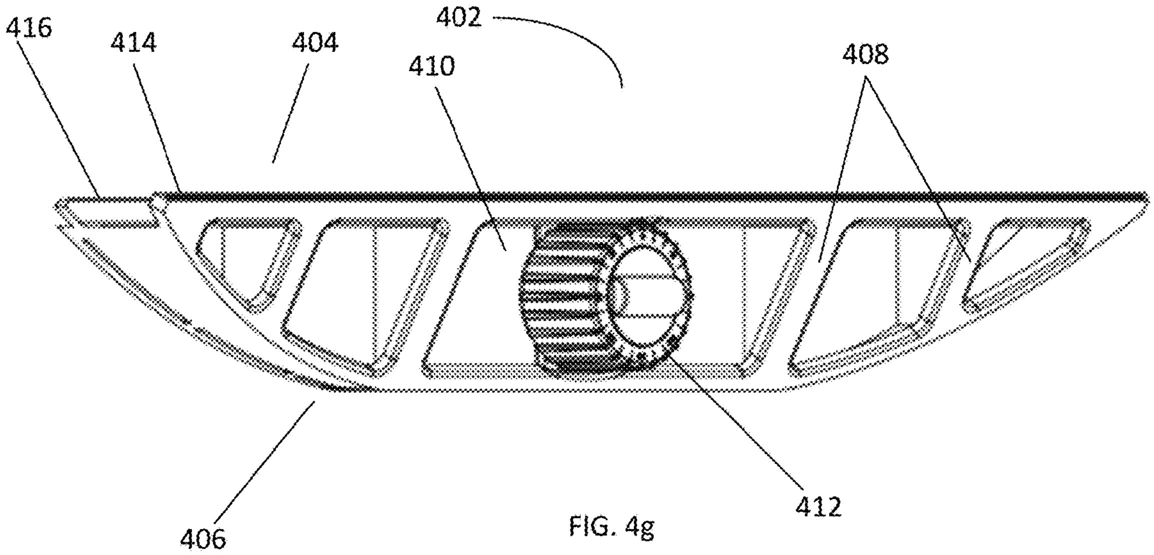
FIG. 4*g* depicts another perspective view of the embodiment shown in FIG. 4*a*.

FIG. 4*g* depicts another perspective view of the embodiment shown in FIG. 4*a*. As shown in FIG. 4*g*, a planar base member 410 can only cover a portion of the base area of a framework 402. In such embodiments, an angular measurement device 412 can then be removably connected to the top surface of a planar base member 410.

Figure 4H:
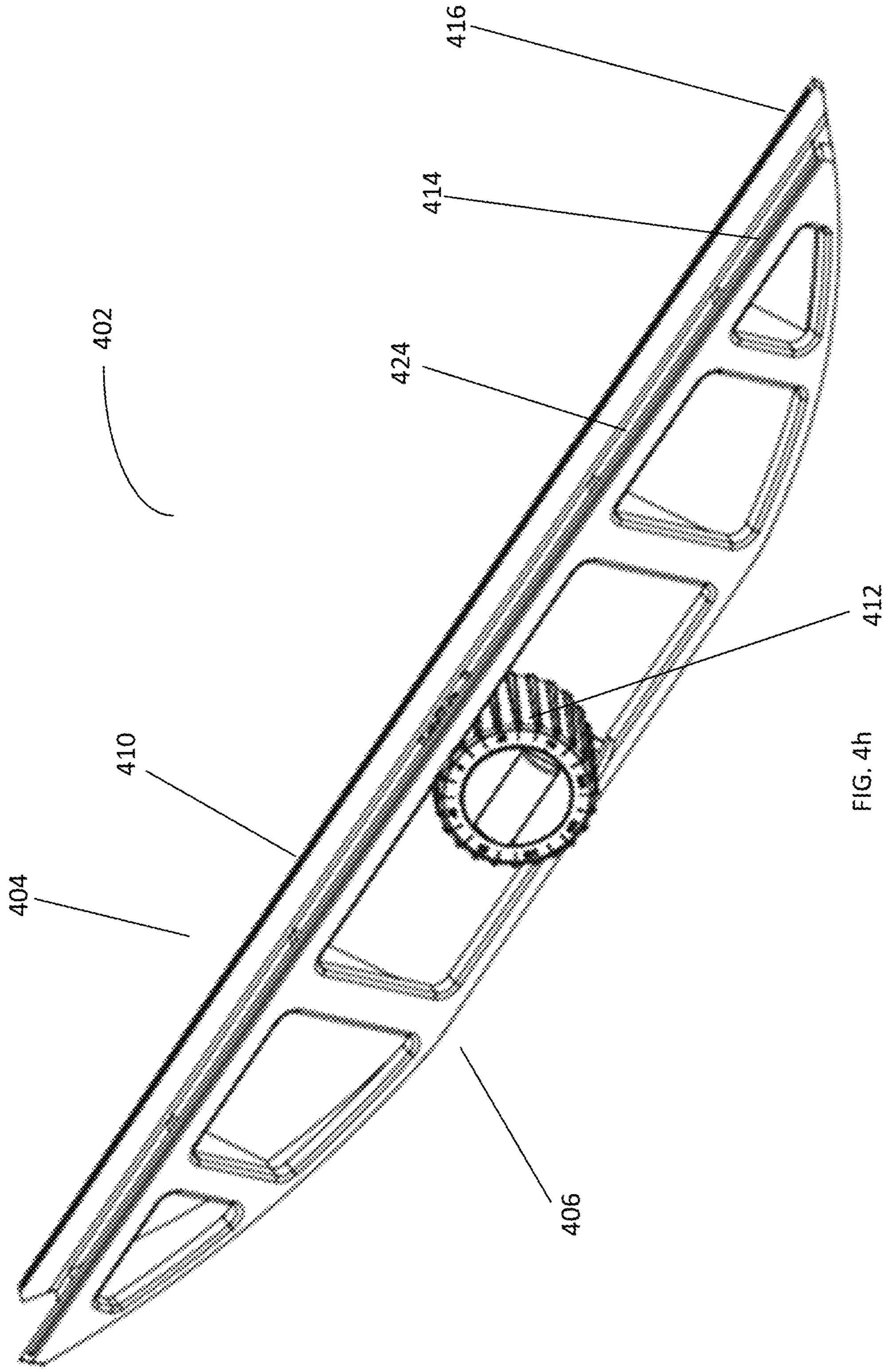
FIG. 4*h* depicts another perspective view of the embodiment shown in FIG. 4*a*.

FIG. 4*h* depicts another perspective view of the embodiment shown in FIG. 4*a*. In some embodiments in which a planar base member 410 does not cover the entirety of the base area of a framework 402, open spaces 424 can be present to further lighten a framework 402.

Figure 5:
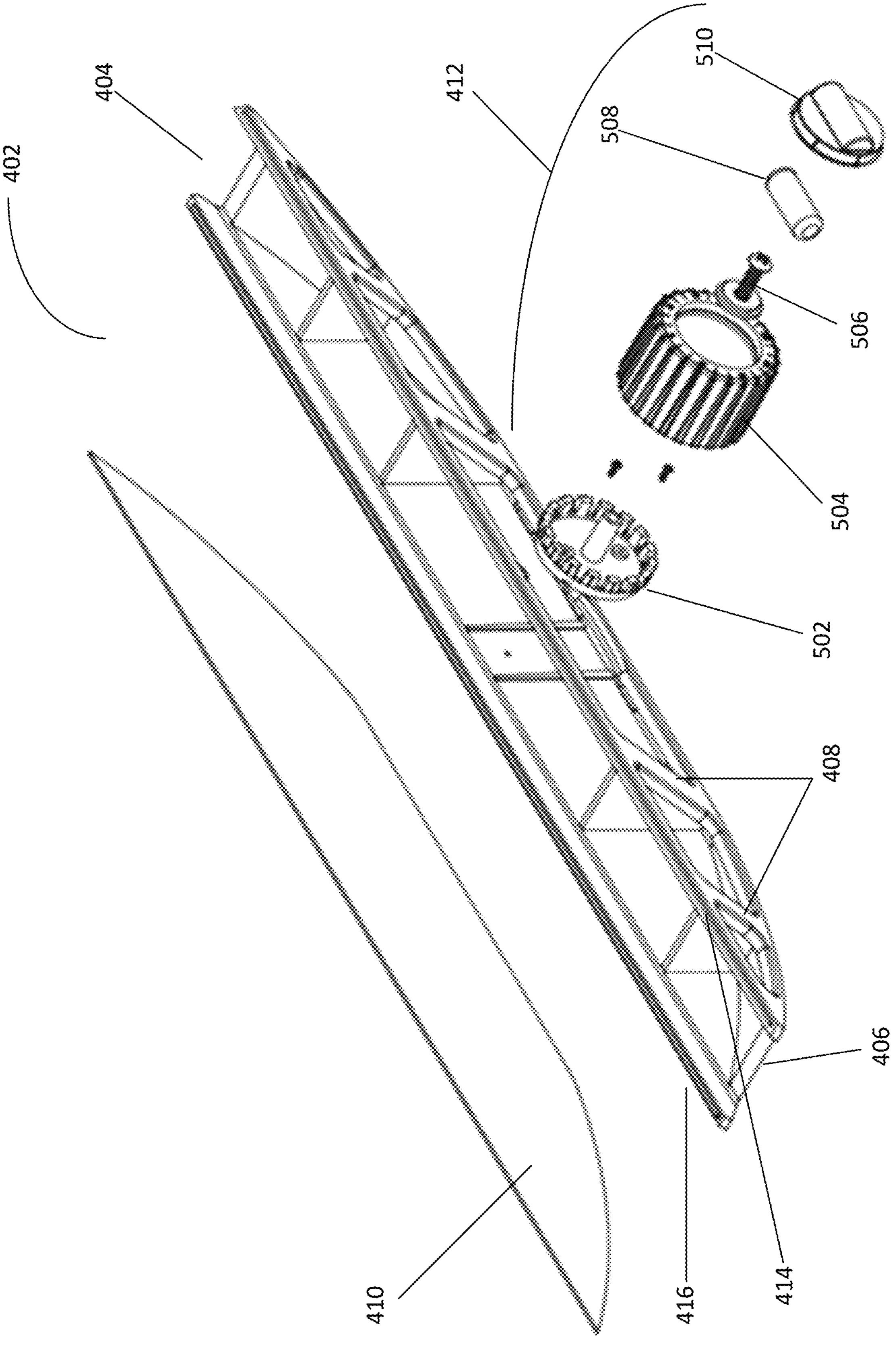
FIG. 5 depicts an isometric assembly view of the embodiment shown in FIG. 4*a*.

FIG. 5 depicts an isometric assembly view of the embodiment shown in FIG. 4*a*. In some embodiments, a planar base member 410 can cover substantially the entirety of the base area of a framework 402. An angular measuring device 412 can further comprise a base dial 502, a housing 504, a central connector 506, a dial crosspiece 508, and a top cap 510.

Figure 6:
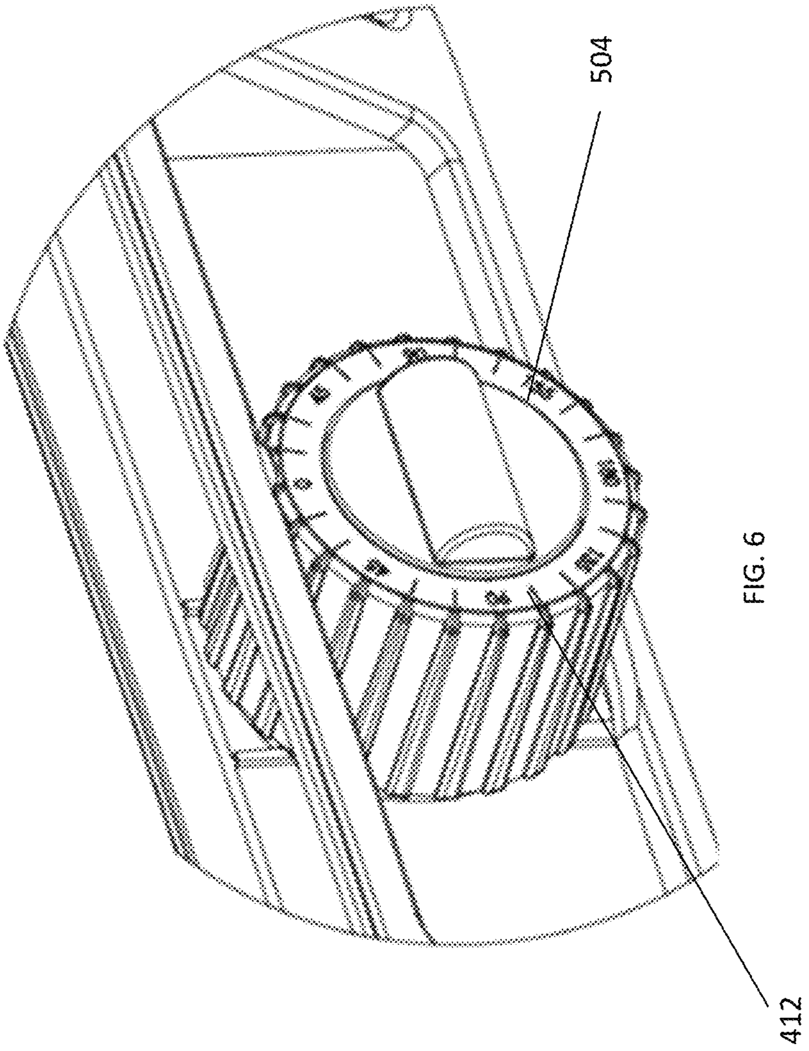
FIG. 6 depicts an isometric detail view of a dial component of the embodiment shown in FIG. 4*a*.

FIG. 6 depicts an isometric detail view of a dial component of the embodiment shown in FIG. 4*a*. In some embodiments, a dial cap 504 can be marked with angle measurements in degrees or any other known and/or convenient units.

Figure 7A:
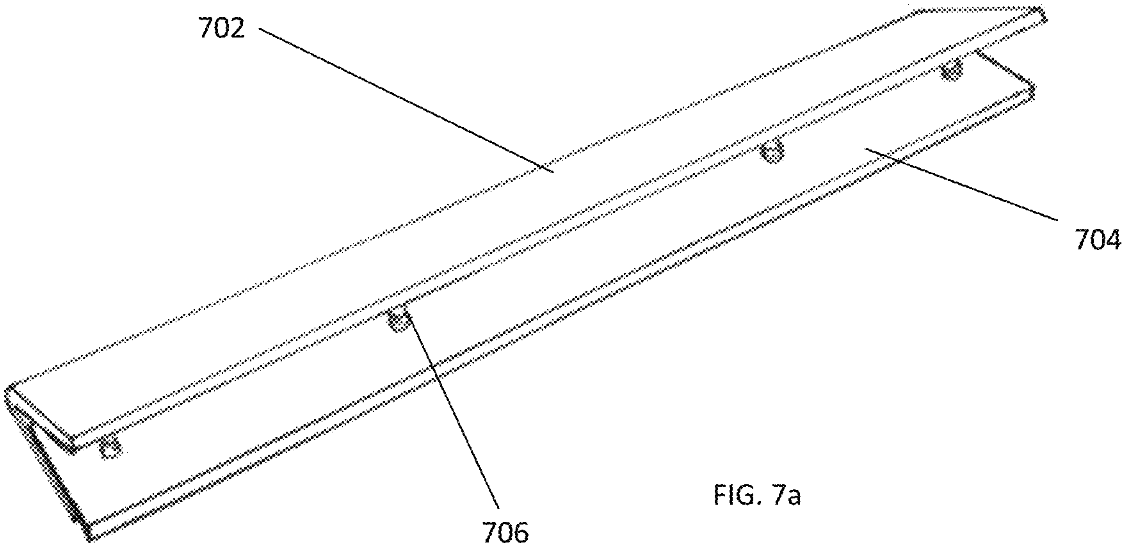
FIG. 7*a* depicts a perspective view of another embodiment of the present device.

FIG. 7*a* depicts a perspective view of another embodiment of the present device. In some embodiments, a base elongated member 702 can be folded longitudinally at an angle of approximately 30 degrees substantially proximal to the central longitudinal axis of a base elongated member 702. In other embodiments, a base elongated member 702 can be folded longitudinally at any other known and/or convenient location and at any other known and/or convenient angle to form an upper portion and a lower portion. In some embodiments, a base elongate member 702 can be fabricated of metal, such as, but not limited to aluminum, but in other embodiments can be made of glass, wood, a polymer or any other known and/or convenient material.

As shown in FIG. 7*a*, A planar elongated member 704 can be removably connected along the lower longitudinal edge of the lower portion of a base elongated member 702. In some embodiments, a planar elongated member 704 can extend laterally from the lower longitudinal folded edge of a base elongated member 702. In some embodiments, approximately one-half of the width of a planar elongated member 704 can overlap with the first longitudinal edge of the lower portion of a base elongated member 702, but in other embodiments can overlap by any other known and/or convenient dimension. A planar elongated member 108 can be removably connected to a base elongated member 702 via at least one fastener 706. In some embodiments, a fastener can be threaded connectors, but in other embodiments can be screws, snaps, glue, or any other known and/or convenient device. In some embodiments, a planar elongated member 704 can be made of a substantially transparent polymer, but in other embodiments can be made of glass, metal, wood, any other known and/or convenient material.

Figure 7B:
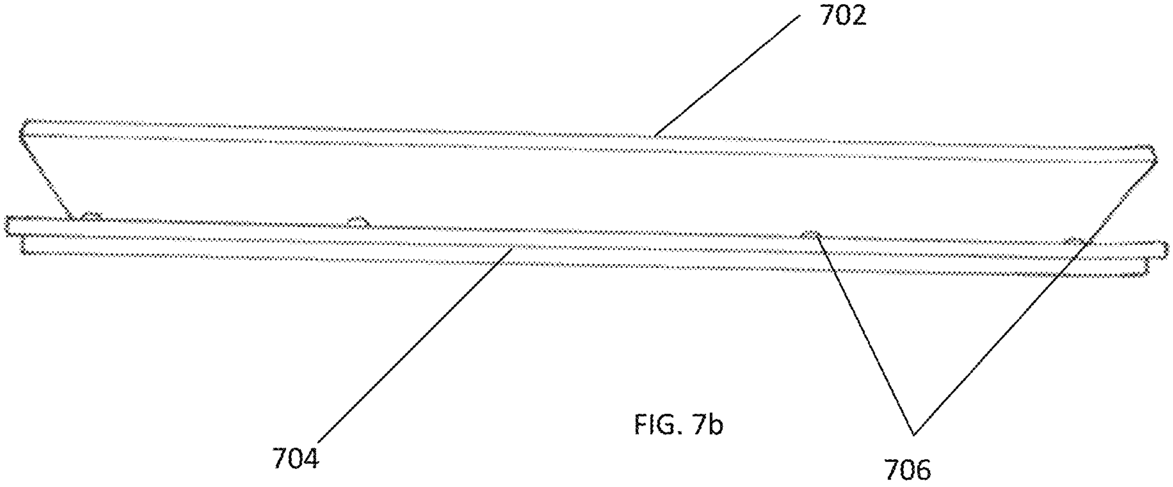
FIG. 7*b* depicts a front view of the embodiment shown in FIG. 7*a*.

FIG. 7*b* depicts a front view of the embodiment shown in FIG. 7*a*. As shown in FIG. 7*b*, A planar elongated member 704 can be elevated above a drawing surface to the thickness of a base elongated member 702. In some embodiments, a planar elongated member 704 can be integrated into a base elongated member 702. In some embodiments, a base elongated member 702 and/or a planar elongated member 104 can have markings for measurement of distance, length, scale or any other known and/or convenient quantity.

Figure 7C:
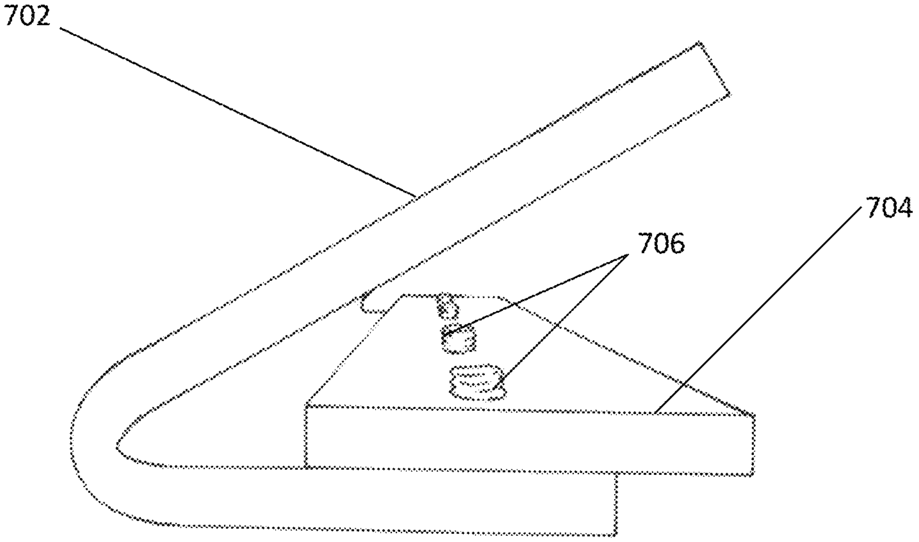
FIG. 7*c* depicts a side view of the embodiment shown in FIG. 7*a*.

FIG. 7*c* depicts a side view of the embodiment shown in FIG. 7*a*. As shown in FIG. 7*c*, the edges of a base elongated member 702 and a planar elongated member 704 can be substantially squared off to form a "sharp" edge, but in other embodiments can be substantially rounded to any known and/or convenient radius to have a "softer" edge.

Figure 7D:
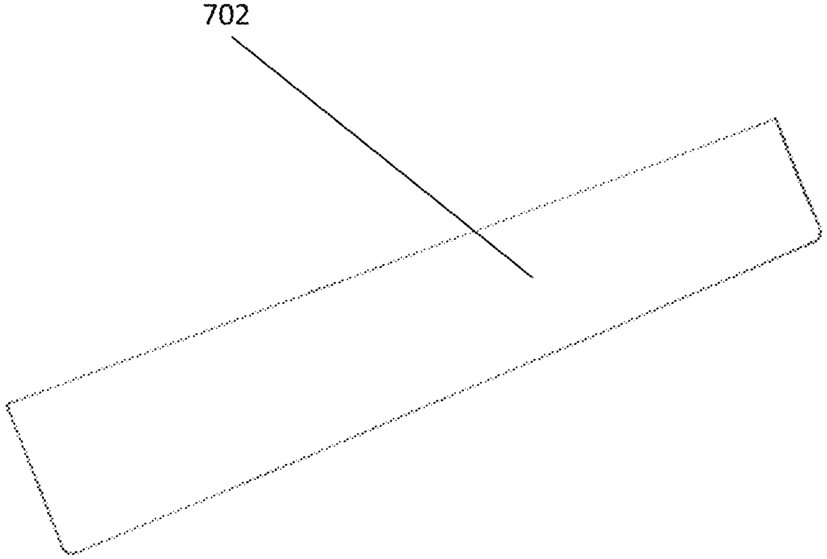
FIG. 7*d* depicts a top view of the embodiment shown in FIG. 7*a*.

FIG. 7*d* depicts a top view of the embodiment shown in FIG. 7*a*. As shown in FIG. 7*d*, an elongated base member 702 can have a substantially rectangular planar profile, but in other embodiments can have any other known and/or convenient geometry.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A straight-edge drawing guide comprising:

a first elongated member having a longitudinal bend of approximately 30 degrees defining an upper portion and a lower portion with an upper longitudinal edge and a lower longitudinal edge, respectively, wherein said lower longitudinal edge is folded back inward;

a second elongated member removably attached to the inside surface of said upper longitudinal edge of said first elongated member;

a third elongated member removably attached to the inside surface of said lower longitudinal edge of said first elongated member.

* * * * *